(12) United States Patent
Singer et al.

(10) Patent No.: US 9,331,998 B2
(45) Date of Patent: May 3, 2016

(54) DYNAMIC SECURED NETWORK IN A CLOUD ENVIRONMENT

(71) Applicant: FortyCloud Ltd., Nes Ziyona (IL)

(72) Inventors: Noam Singer, Kibbutz Einat (IL); Amir Naftali, Kiryat Ono (IL)

(73) Assignee: FORTY CLOUD LTD., Nes Ziyona (IL)

( * ) Notice: Subject to any disclaimer, the term of this patent is extended or adjusted under 35 U.S.C. 154(b) by 37 days.

(21) Appl. No.: 13/827,251

(22) Filed: Mar. 14, 2013

(65) Prior Publication Data

US 2014/0282817 A1    Sep. 18, 2014

(51) Int. Cl.
| | |
|---|---|
| G06F 7/04 | (2006.01) |
| H04L 29/06 | (2006.01) |
| G06F 21/33 | (2013.01) |
| H04L 9/32 | (2006.01) |
| H04L 29/08 | (2006.01) |
| H04L 12/715 | (2013.01) |

(52) U.S. Cl.
CPC .......... *H04L 63/0807* (2013.01); *G06F 21/335* (2013.01); *H04L 63/0272* (2013.01); *H04L 63/08* (2013.01); *H04L 67/28* (2013.01); *H04L 9/3213* (2013.01); *H04L 45/64* (2013.01); *H04L 63/164* (2013.01); *H04L 67/02* (2013.01)

(58) Field of Classification Search
CPC ..... G06F 21/335; G06F 21/445; G06F 21/44; H04L 9/3213; H04L 63/0807; H04L 9/3228; H04L 63/08; H04L 63/0272; H04L 67/28; H04L 45/64; H04L 63/164; H04L 67/02
USPC .................... 726/9, 10, 12; 713/150
See application file for complete search history.

(56) References Cited

U.S. PATENT DOCUMENTS

| | | | |
|---|---|---|---|
| 8,132,242 B1* | 3/2012 | Wu | 726/8 |
| 8,800,009 B1* | 8/2014 | Beda, III | H04L 63/0846 |
| | | | 713/155 |
| 9,135,412 B1* | 9/2015 | Talvensaari | G06F 21/10 |
| 2009/0119182 A1* | 5/2009 | Krstulich et al. | 705/26 |
| 2011/0261828 A1 | 10/2011 | Smith | |
| 2011/0320821 A1* | 12/2011 | Alkhatib et al. | 713/176 |
| 2012/0226792 A1 | 9/2012 | Johnson et al. | |
| 2012/0281706 A1 | 11/2012 | Agarwal et al. | |

(Continued)

OTHER PUBLICATIONS http://web.archive.org/web/20121002084315/http://www.ciphergraph.com/full-network-access, Secure Full Network Access for your Cloud and Datacenter, copyright 2012, pp. 1-2, Mar. 13, 2013.
http://www.cloudpassage.com/use-cases/compliance.html, Cloud Passage, pp. 1-3, copyright 2013, Mar. 13, 2013.
http://web.archive.org/web/20121110055851/http://www.cohesiveft.com/products/vns3, Virtual Network Server, copyright 2012, pp. 1-2, Mar. 13, 2013.
http://web.archive.org/web/20130116044545/http://www.dome9.com/overview/system-architecture, Cloud Security as Elastic as Your Infrastructure, pp. 1-2, Mar. 13, 2013.

(Continued)

*Primary Examiner* — Nirav B Patel
(74) *Attorney, Agent, or Firm* — Browdy and Neimark, PLLC

(57) ABSTRACT

The disclosure presents systems, methods and computer program products relating to an overlay network in a cloud environment. A management machine may manage an overlay network. Machine(s), which may be provided by cloud provider(s), may be added to or removed from the overlay network. Data relating to a machine may be gathered and configuration data may be determined, for example when the machine is being added to the overlay network. A device associated with a user authorized for the overlay network may connect to the overlay network. The overlay network may include one or more secure tunnels wherein a private IP address or public IP address may encapsulate an overlay IP address.

30 Claims, 5 Drawing Sheets

(56) References Cited

U.S. PATENT DOCUMENTS

| | | | |
|---|---|---|---|
| 2013/0042314 A1* | 2/2013 | Kelley | 726/9 |
| 2013/0132854 A1* | 5/2013 | Raleigh et al. | 715/738 |
| 2013/0227662 A1* | 8/2013 | Crampton | G06F 21/6209 726/6 |

OTHER PUBLICATIONS

Mell, et al., The NIST Definition of Cloud Computing, NIST Special Publication 800-145, cover page, pp. i-iii, and pp. 1-3, Sep. 2011.

\* cited by examiner

DYNAMIC SECURED NETWORK IN A CLOUD ENVIRONMENT

TECHNICAL FIELD

The disclosure relates to overlay networks.

BACKGROUND

An overlay network may be a computer network which may be built on top of an underlying network such as the Internet. Overlay networks on top of the Internet have been built or proposed in order to permit routing of messages to destinations not specified by an IP address, or to connect between separate networks.

SUMMARY

In accordance with the presently disclosed subject matter, there is provided a method of adding a machine provided by a cloud provider to an overlay network, the method performed by the machine and comprising: gathering data relating to the machine, including a private internet protocol (IP) address of the machine within a network of the cloud provider; receiving or determining configuration data for connecting the machine to the overlay network, including an overlay IP address for the machine in the overlay network, the configuration data being at least partly dependent on the gathered data; and connecting the machine to the overlay network in accordance with at least part of the configuration data, including establishing at least one secure tunnel, wherein for any secure tunnel a private IP address or a public IP address of the machine is used to encapsulate the overlay address.

In some embodiments of the method, the configuration data is also at least partly dependent on data gathered relating to at least one other machine in the overlay network.

In some embodiments of the method, the connecting is performed with assistance of at least one other machine in the overlay network.

In some embodiments of the method, the overlay IP address is allocated so as not to conflict with any other allocated overlay IP address, or with any private IP address in any network of any cloud provider with at least one machine in the overlay network.

In some embodiments, the method further comprises: presenting a machine authentication token when communicating with a management machine.

In some embodiments, the method further comprises: subsequent to connection to the overlay network, gathering data relating to the machine.

In some embodiments, the method further comprises: subsequent to connection to the overlay network, receiving or determining configuration data for connecting the machine to the overlay network; and if the configuration data is updated, updating machine connection to the overlay network in accordance with at least part of the updated configuration data.

In some embodiments, the method further comprises: translating a policy regarding access control into at least one firewall rule for implementing the policy.

In some embodiments, the method further comprises: translating a policy regarding private/public interface into at least one rule for implementing the policy.

In some embodiments of the method, the configuration data includes an internal DNS name for the machine.

In some embodiments of the method, the machine is a server or a gateway.

In some embodiments of the method, the private IP address is used whenever possible.

In some embodiments, the method further comprises: receiving an indication that the machine is to be removed from the overlay network; and removing the machine from the overlay network.

In some embodiments, the method enables provisioning of rapid elasticity to the overlay network.

In some embodiments of the method, the overlay network comprises one or more secure tunnels and traffic between machines in the overlay network is routed via the overlay network.

In accordance with the presently disclosed subject matter, there is provided a method of connecting a device to an overlay network, the overlay network including at least one server provided by at least one cloud provider, comprising: determining that the device is attempting connection to the overlay network; verifying that a user associated with the device is authorized for the overlay network; assigning an overlay IP to the device from a pool of overlay IP addresses; and connecting the device to the overlay network by establishing at least one secure tunnel between the device and a gateway in the overlay network.

In some embodiments the method further comprises: receiving the pool of overlay IP addresses from a management machine.

In some embodiments, the method further comprises: translating an internal DNS name for a server, provided by the device, to an overlay IP address of the server.

In some embodiments the method further comprises: translating an overlay IP address assigned to the device into an overlay IP address of the gateway.

In some embodiments, the method further comprises: translating an access control policy to at least one server in the overlay network which relates to the user into at least one firewall rule for implementing the policy.

In some embodiments, the method enables provisioning of at least one of: broad network access or on-demand self service to the user.

In some embodiments of the method, the overlay network comprises one or more secure tunnels and traffic between the device and any server in the overlay network is routed over the overlay network via the gateway.

In accordance with the presently disclosed subject matter, there is provided a method of managing an overlay network, performed by a management machine, comprising: determining that a server or gateway provided by a cloud provider is to be added to the overlay network; and generating program code for requesting software for the server or gateway; thereby enabling the program code to be run on the server or gateway, and software is to be provided to the server or gateway which enables the server or gateway to gather data relating to the server or gateway, including a private internet protocol (IP) address of the server or gateway within a network of the cloud provider, to receive or determine configuration data for connecting the server or gateway to the overlay network, including an overlay IP address for the server or gateway in the overlay network, the configuration data being at least partly dependent on the gathered data, and to connect to the overlay network in accordance with at least part of the configuration data, including establishing at least one secure tunnel, wherein for any secure tunnel a private IP address or a public IP address of the server or gateway is used to encapsulate the overlay address.

In some embodiments, the method further comprises: determining that the server or gateway is to be removed from the overlay network; and indicating to the server or gateway to remove the software.

In some embodiments, the method enables provisioning of rapid elasticity to the overlay network.

In accordance with the presently disclosed subject matter there is provided a method of managing an overlay network, performed by a management machine, comprising: determining that a server or gateway provided by a cloud provider is to be added to the overlay network; generating a temporary machine authentication token for the server or gateway; receiving the temporary machine authentication token from the server or gateway and authenticating the server or gateway; and providing a replacement longer expiration machine authentication token to the server or gateway; wherein after the replacement token has been provided, the server or gateway connects to the overlay network, including establishing at least one secure tunnel, and wherein for any secure tunnel a private IP address or a public IP address of the server or gateway is used to encapsulate an overlay address that was allocated to the server or gateway.

In some embodiments, the method further comprises: receiving the longer expiration machine authentication token from a different machine; determining that the longer expiration machine authentication token does not match the different machine; and acting in accordance with a procedure regarding a non-matching token.

In some embodiments, the method further comprises: generating program code for requesting software for the server or gateway.

In some embodiments, the method further comprises: determining that the server or gateway is to be removed from the overlay network; and indicating to the server or gateway to disconnect from the overlay network.

In some embodiments, the method enables provisioning of rapid elasticity to the overlay network.

In accordance with the presently disclosed subject matter, there is provided a method of managing an overlay network, performed by a management machine, comprising: determining that a server or gateway provided by a cloud provider is to be added to the overlay network; receiving data from the server or gateway relating to the server or gateway, including a private internet protocol (IP) address of the server or gateway within a network of the cloud provider; determining configuration data for connecting the server or gateway to the overlay network, including an overlay IP address for the server or gateway in the overlay network, the configuration data being at least partly dependent on the gathered data; and providing the configuration data at least to the server or gateway, thereby enabling the server or gateway to connect to the overlay network in accordance with at least part of the configuration data, including to establish at least one secure tunnel, wherein for any secure tunnel a private IP address or a public IP address of the server or gateway is used to encapsulate the overlay address.

In some embodiments, the method further comprises: providing configuration data to at least one other server or gateway in the overlay network, thereby enabling the at least one other server or gateway in the network to assist in establishing the at least one secure tunnel.

In some embodiments, the method further comprises: receiving data from at least one other server or gateway in the overlay network, wherein the configuration data is also at least partly dependent on received data from the at least one other server or gateway.

In some embodiments, the method further comprises: determining that the server or gateway is to be removed from the overlay network; and indicating to the server or gateway to disconnect from the overlay network.

In some embodiments, the method enables provisioning of rapid elasticity to the overlay network.

In accordance with the presently disclosed subject matter there is provided a method of adding a server to or removing a server from an overlay network, comprising: a device accessing management software in a management machine; and the device indicating that a server provided by a cloud provider is to be added or removed from an overlay network; thereby enabling the server to connect to the overlay network, including to establish at least one secure tunnel, wherein for any secure tunnel a private IP address or a public IP address of the server is used to encapsulate an overlay address which was allocated to the server, or thereby enabling the server to disconnect from the overlay network.

In some embodiments, wherein if a server is being added the management software generates program code, the method further comprises: the device providing the generated program code to the server, wherein the program code when run enables software to be provided to the server for connecting the server to the overlay network.

In some embodiments, the method further comprises: the device indicating an access control policy relating to the server.

In some embodiments of the method, the management software is provided as a service in a cloud environment.

In some embodiments, the method enables provisioning of at least one of: broad network access or on-demand self service to a user associated with the device.

In accordance with the presently disclosed subject matter, there is provided a method of adding at least one gateway provided by at least one cloud provider to an overlay network, comprising: a device accessing management software in a management machine; and a device providing program code generated by the management software to at least one gateway provided by the at least one cloud provider; thereby enabling allocation of at least one overlay IP address to the at least one gateway, and allocation of a pool of overlay IP addresses from which an overlay IP address is to be assigned by a gateway to a device connecting to the overlay network which is associated with a user authorized for the overlay network, so that the overlay address of the device will be encapsulated by a public IP address of the device in a secure tunnel established between the gateway and the connecting device.

In some embodiments of the method, the management software is provided as a service in a cloud environment.

In some embodiments, the method enables provisioning of at least one of: broad network access or on-demand self service to a user associated with the device.

In accordance with the presently disclosed subject matter, there is provided a method of connecting to an overlay network which includes at least one machine provided by a cloud provider, comprising: a device providing an identifier of an associated user to a gateway of the overlay network; and if the user is an authorized user, the device receiving an overlay IP address; thereby enabling a secure tunnel to be established between the device and the gateway, wherein the public IP address of the device is used to encapsulate the overlay IP address.

In some embodiments, the method enables provisioning of at least one of: broad network access or on-demand self service to the user.

In accordance with the presently disclosed subject matter, there is provided a method of managing an overlay network, performed by a management machine, comprising: receiving data from at least one machine provided by at least one cloud provider, which is included in the overlay network; and providing configuration data determined at least partly based on the received data, to at least one machine provided by at least one cloud provider, which is in the overlay network; thereby enabling addition of, removal of, or change in at least one secure tunnel comprised in the overlay network.

In some embodiments, the method enables provisioning of rapid elasticity to the overlay network.

In accordance with the presently disclosed subject matter, there is provided a system for adding a machine provided by a cloud provider to an overlay network, the system including the machine capable of: gathering data relating to the machine, including a private internet protocol (IP) address of the machine within a network of the cloud provider; receiving or determining configuration data for connecting the machine to the overlay network, including an overlay IP address for the machine in the overlay network, the configuration data being at least partly dependent on the gathered data; and connecting the machine to the overlay network in accordance with at least part of the configuration data, including establishing at least one secure tunnel, wherein for any secure tunnel a private IP address or a public IP address of the machine is used to encapsulate the overlay address.

In accordance with the presently disclosed subject matter, there is provided a system for connecting a device to an overlay network, the overlay network including at least one server provided by at least one cloud provider, the system comprising a gateway capable of: determining that the device is attempting connection to the overlay network; verifying that a user associated with the device is authorized for the overlay network; assigning an overlay IP to the device from a pool of overlay IP addresses; and connecting the device to the overlay network by establishing at least one secure tunnel between the device and the gateway.

In accordance with the presently disclosed subject matter, there is provided a system for managing an overlay network, the system comprising a management machine capable of: determining that a server or gateway provided by a cloud provider is to be added to the overlay network; and generating program code for requesting software for the server or gateway; thereby enabling the program code to be run on the server or gateway, and software is to be provided to the server or gateway which enables the server or gateway to gather data relating to the server or gateway, including a private internet protocol (IP) address of the server or gateway within a network of the cloud provider, to receive or determine configuration data for connecting the server or gateway to the overlay network, including an overlay IP address for the server or gateway in the overlay network, the configuration data being at least partly dependent on the gathered data, and to connect to the overlay network in accordance with at least part of the configuration data, including establishing at least one secure tunnel, wherein for any secure tunnel a private IP address or a public IP address of the server or gateway is used to encapsulate the overlay address.

In accordance with the presently disclosed subject matter, there is provided a system for managing an overlay network, comprising a management machine capable of: determining that a server or gateway provided by a cloud provider is to be added to the overlay network; generating a temporary machine authentication token for the server or gateway; receiving the temporary machine authentication token from the server or gateway and authenticating the server or gateway; and providing a replacement longer expiration machine authentication token to the server or gateway; wherein after the replacement token has been provided, the server or gateway connects to the overlay network, including establishing at least one secure tunnel, and wherein for any secure tunnel a private IP address or a public IP address of the server or gateway is used to encapsulate an overlay address that was allocated to the server or gateway.

In accordance with the presently disclosed subject matter, there is provided a system for managing an overlay network, comprising a management machine, capable of: determining that a server or gateway provided by a cloud provider is to be added to the overlay network; receiving data from the server or gateway relating to the server or gateway, including a private internet protocol (IP) address of the server or gateway within a network of the cloud provider; determining configuration data for connecting the server or gateway to the overlay network, including an overlay IP address for the server or gateway in the overlay network, the configuration data being at least partly dependent on the gathered data; and providing the configuration data at least to the server or gateway, thereby enabling the server or gateway to connect to the overlay network in accordance with at least part of the configuration data, including to establish at least one secure tunnel, wherein for any secure tunnel a private IP address or a public IP address of the server or gateway is used to encapsulate the overlay address.

In accordance with the presently disclosed subject matter, there is provided a system for adding a server to or removing a server from an overlay network, comprising a device capable of: accessing management software in a management machine; and indicating that a server provided by a cloud provider is to be added or removed from an overlay network; thereby enabling the server to connect to the overlay network, including to establish at least one secure tunnel, wherein for any secure tunnel a private IP address or a public IP address of the server is used to encapsulate an overlay address which was allocated to the server, or thereby enabling the server to disconnect from the overlay network.

In accordance with the presently disclosed subject matter, there is provide a system for adding at least one gateway provided by at least one cloud provider to an overlay network, comprising a device capable of: accessing management software in a management machine; and providing program code generated by the management software to at least one gateway provided by the at least one cloud provider; thereby enabling allocation of at least one overlay IP address to the at least one gateway, and allocation of a pool of overlay IP addresses from which an overlay IP address is to be assigned by a gateway to a device connecting to the overlay network which is associated with a user authorized for the overlay network, so that the overlay address of the device will be encapsulated by a public IP address of the device in a secure tunnel established between the gateway and the connecting device.

In accordance with the presently disclosed subject matter, there is provide a system for connecting to an overlay network which includes at least one machine provided by a cloud provider, comprising a device capable of: providing an identifier of an associated user to a gateway of the overlay network; and if the user is an authorized user, receiving an overlay IP address; thereby enabling a secure tunnel to be established between the device and the gateway, wherein the public IP address of the device is used to encapsulate the overlay IP address.

In accordance with the presently disclosed subject matter, there is provided a system for managing an overlay network, comprising a management machine, capable of: receiving data from at least one machine provided by at least one cloud provider, which is included in the overlay network; and providing configuration data determined at least partly based on the received data, to at least one machine provided by at least one cloud provider, which is in the overlay network; thereby enabling addition of, removal of, or change in at least one secure tunnel comprised in the overlay network.

In accordance with the presently disclosed subject matter, there is provided a computer program product comprising a machine useable medium having machine readable program code embodied therein for adding a machine provided by a cloud provider to an overlay network, the computer program product comprising: machine readable program code for causing the machine to gather data relating to the machine, including a private internet protocol (IP) address of the machine within a network of the cloud provider; machine readable program code for causing the machine to receive or determine configuration data for connecting the machine to the overlay network, including an overlay IP address for the machine in the overlay network, the configuration data being at least partly dependent on the gathered data; and computer readable program code for causing the machine to connect the machine to the overlay network in accordance with at least part of the configuration data, including establishing at least one secure tunnel, wherein for any secure tunnel a private IP address or a public IP address of the machine is used to encapsulate the overlay address.

In accordance with the presently disclosed subject matter, there is provided a computer program product comprising a machine useable medium having machine readable program code embodied therein for connecting a device to an overlay network, said overlay network including at least one server provided by at least one cloud provider, the computer program product comprising: machine readable program code for causing a machine to determine that a device is attempting connection to the overlay network; machine readable program code for causing the machine to verify that a user associated with the device is authorized for the overlay network; machine readable program code for causing the machine to assign an overlay IP to the device from a pool of overlay IP addresses; and machine readable program code for causing the machine to connect the device to the overlay network by establishing at least one secure tunnel between the device and the machine.

In accordance with the presently disclosed subject matter, there is provided a computer program product comprising a machine useable medium having machine readable program code embodied therein for managing an overlay network, the computer program product comprising: machine readable program code for causing a machine to determine that a server or gateway provided by a cloud provider is to be added to the overlay network; and machine readable program code for causing the machine to generate program code for requesting software for the server or gateway; thereby enabling the program code to be run on the server or gateway, and software is to be provided to the server or gateway which enables the server or gateway to gather data relating to the server or gateway, including a private internet protocol (IP) address of the server or gateway within a network of the cloud provider, to receive or determine configuration data for connecting the server or gateway to the overlay network, including an overlay IP address for the server or gateway in the overlay network, the configuration data being at least partly dependent on the gathered data, and to connect to the overlay network in accordance with at least part of the configuration data, including establishing at least one secure tunnel, wherein for any secure tunnel a private IP address or a public IP address of the server or gateway is used to encapsulate the overlay address.

In accordance with the presently disclosed subject matter, there is provided a computer program product comprising a machine useable medium having machine readable program code embodied therein for managing an overlay network, the computer program product comprising: machine readable program code for causing a machine to determine that a server or gateway provided by a cloud provider is to be added to the overlay network; machine readable program code for causing the machine to generate a temporary machine authentication token for the server or gateway; machine readable program code for causing the machine to receive the temporary machine authentication token from the server or gateway and to authenticate the server or gateway; and machine readable program code for causing the machine to provide a replacement longer expiration machine authentication token to the server or gateway; wherein after the replacement token has been provided, the server or gateway connects to the overlay network, including establishing at least one secure tunnel, and wherein for any secure tunnel a private IP address or a public IP address of the server or gateway is used to encapsulate an overlay address that was allocated to the server or gateway.

In accordance with the presently disclosed subject matter, there is provided a computer program product comprising a machine useable medium having machine readable program code embodied therein for managing an overlay network, the computer program product comprising: machine readable program code for causing a machine to determine that a server or gateway provided by a cloud provider is to be added to the overlay network; machine readable program code for causing the machine to receive data from the server or gateway relating to the server or gateway, including a private internet protocol (IP) address of the server or gateway within a network of the cloud provider; machine readable program code for causing the machine to determine configuration data for connecting the server or gateway to the overlay network, including an overlay IP address for the server or gateway in the overlay network, the configuration data being at least partly dependent on the gathered data; and machine readable program code for causing the machine to provide the configuration data at least to the server or gateway, thereby enabling the server or gateway to connect to the overlay network in accordance with at least part of the configuration data, including to establish at least one secure tunnel, wherein for any secure tunnel a private IP address or a public IP address of the server or gateway is used to encapsulate the overlay address.

In accordance with the presently disclosed subject matter, there is provided a computer program product comprising a machine useable medium having machine readable program code embodied therein for adding a server to or removing a server from an overlay network, the computer program product comprising: machine readable program code for causing a machine to access management software in a management machine; and machine readable program code for causing the machine to indicate that a server provided by a cloud provider is to be added or removed from an overlay network; thereby enabling the server to connect to the overlay network, including to establish at least one secure tunnel, wherein for any secure tunnel a private IP address or a public IP address of the server is used to encapsulate an overlay address which was allocated to the server, or thereby enabling the server to disconnect from the overlay network.

In accordance with the presently disclosed subject matter, there is provided a computer program product comprising a machine useable medium having machine readable program code embodied therein for adding at least one gateway provided by at least one cloud provider to an overlay network, the computer program product comprising: machine readable program code for causing a machine to access management software in a management machine; and machine readable program code for causing the machine to provide program code generated by the management software to at least one gateway provided by the at least one cloud provider; thereby enabling allocation of at least one overlay IP address to the at least one gateway, and allocation of a pool of overlay IP addresses from which an overlay IP address is to be assigned by a gateway to a device connecting to the overlay network which is associated with a user authorized for the overlay network, so that the overlay address of the device will be encapsulated by a public IP address of the device in a secure tunnel established between the gateway and the connecting device.

In accordance with the presently disclosed subject matter, there is provided a computer program product comprising a machine useable medium having machine readable program code embodied therein for connecting to an overlay network which includes at least one machine provided by a cloud provider, the computer program product comprising: machine readable program code for causing a machine to provide an identifier of an associated user to a gateway of the overlay network; and machine readable program code for causing the machine, if the user is an authorized user, to receive an overlay IP address; thereby enabling a secure tunnel to be established between the machine and the gateway, wherein the public IP address of the machine is used to encapsulate the overlay IP address.

In accordance with the presently disclosed subject matter, there is provided a computer program product comprising a machine useable medium having machine readable program code embodied therein for managing an overlay network, the computer program product comprising: machine readable program code for causing a machine to receive data from at least one machine provided by at least one cloud provider, which is included in the overlay network; and machine readable program code for causing the machine to provide configuration data determined at least partly based on the received data, to at least one machine provided by at least one cloud provider, which is in the overlay network; thereby enabling addition of, removal of, or change in at least one secure tunnel comprised in the overlay network.

BRIEF DESCRIPTION OF THE DRAWINGS

In order to understand the subject matter and to see how it may be carried out in practice, non-limiting embodiments will be described, with reference to the accompanying drawings, in which.

Figure 1:
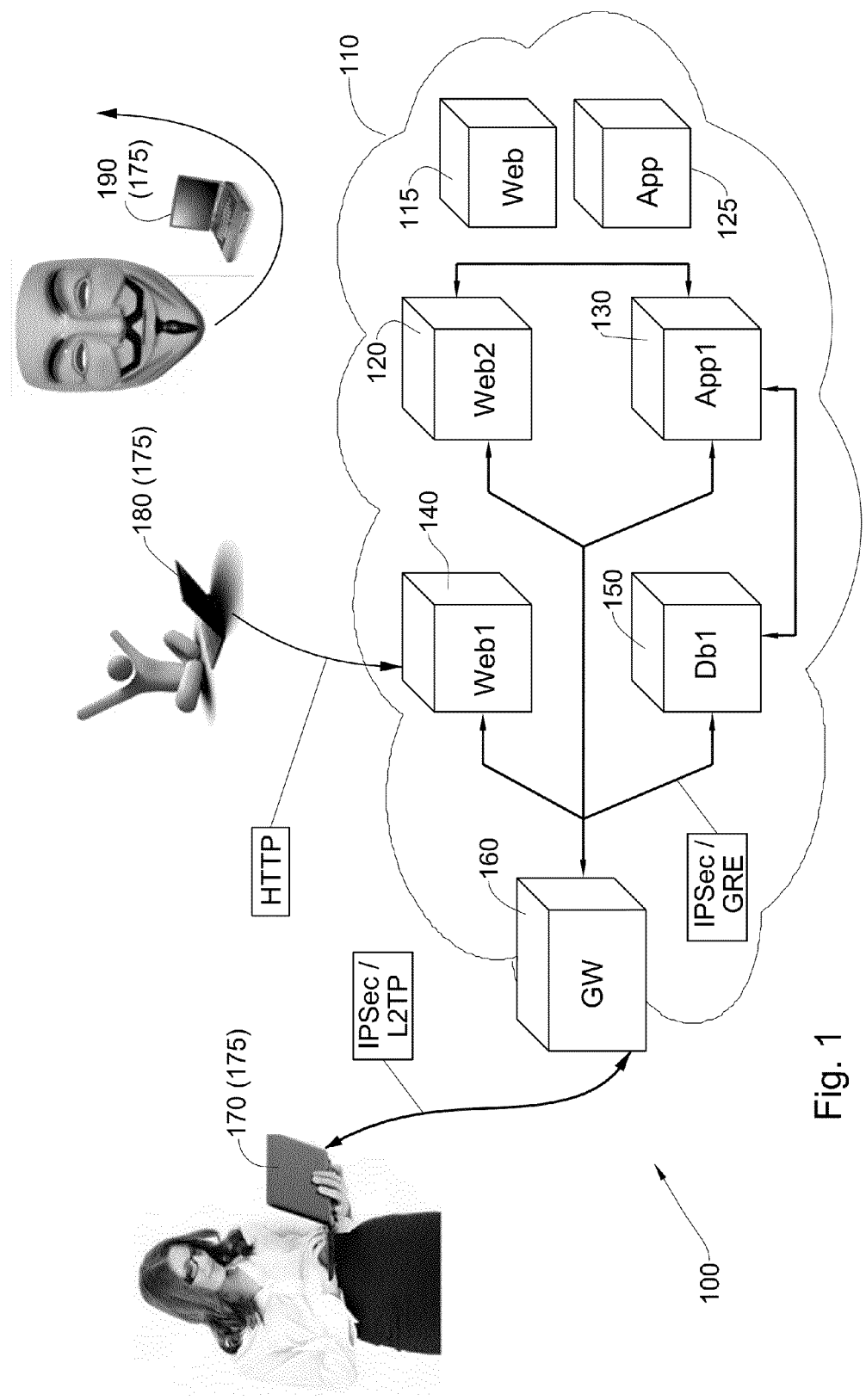
FIG. 1 illustrates a topology an overlay network including a plurality of machines, in accordance with some embodiments of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analogous elements.

DETAILED DESCRIPTION OF THE DRAWINGS

In the following detailed description, numerous specific details are set forth in order to provide a thorough understanding of the subject matter. However, it will be understood by those skilled in the art that some examples of the subject matter may be practiced without these specific details. In other instances, well-known features, structures, stages, methods, modules, elements, and systems have not been described in detail so as not to obscure the subject matter.

Usage of terms "normally", "typically although not necessarily", "although not necessarily so", "such as", "e.g.", "possibly", "it is possible", "optionally", "say", "one embodiment", "embodiments", "an embodiment", "some embodiments", "various embodiments", "other embodiments", "certain embodiments", "some other embodiments", illustrated embodiments", "another embodiment", "for example" "one example", "an example" "some examples", "examples", "another example", "various examples", "other examples", "for instance", "an instance", "one instance", "some instances", "another instance", "other instances", "various instances" "one case", "cases", "some cases", "another case", "other cases", "various cases", or variants thereof should be construed as meaning that a particular described feature, structure, stage, method, module, element, or system is included in at least one non-limiting embodiment of the subject matter, but not necessarily in all embodiments. The appearance of the same term does not necessarily refer to the same embodiment(s).

The term "illustrated embodiments", is used to direct the attention of the reader to one or more of the figures, but should not be construed as necessarily favoring any embodiments over any other.

Usage of conditional language, such as "may", "can", "could", or variants thereof should be construed as conveying that one or more embodiments of the subject matter may include, while one or more other embodiments of the subject matter may not necessarily include, certain features, structures, stages, methods, modules, elements, or systems. Thus such conditional language is not generally intended to imply that a particular described feature, structure, stage, method, module, element, or system is necessarily included in all embodiments of the subject matter.

Usage of the term "or" should be construed to mean "and/or" unless expressly indicated otherwise, or unless incorrect for a particular context.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

As used herein terms such as "processing", "calculating", "determining", "generating", "configuring", "selecting", "defining", "computing", "obtaining", "accessing", "receiving", "adding", "providing", "performing", "executing", "gathering", "collecting", "connecting", "using", "disconnecting", "establishing", "securing", "encapsulating", "routing", "presenting", "translating", "removing", "provisioning", "verifying", "authenticating", "changing", "enabling", "running", identifying", "replacing", "acting", "accessing", "copying", "installing", "allowing", "attempting", logging", or the like should be construed as referring to the action(s) or process(es) of any combination of software, hardware or firmware. For example, although not necessarily so, these terms may refer to the action(s) or process(es) of one or more machine(s) specially constructed for the desired purposes, or one or more machine(s) specially configured for the desired purposes by program code stored in a machine readable medium. The action(s) or process(es) may, for instance, manipulate or transform data represented as physical, such as electronic quantities, within the register(s) or memory/ies of the machine(s) into other data similarly represented as physical quantities within the memory/ies, register(s) or other such information storage, transmission or display element(s) of the machine(s). The term machine should be expansively construed to cover any kind of virtual or physical machine which may have data processing capabilities and which may be made up of any combination of hardware, software or firmware that includes at least some hardware. Examples of such a machine may include: a user device (e.g. personal computer, laptop, communication device, smartphone, etc), an input/output device (e.g. mouse, keyboard, screen, touchscreen, etc), a gateway, a server (e.g. web server, database server, application server etc), a management machine, etc.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model comprises at least five characteristics, at least three service models, and at least four deployment models.

Characteristics may include the following:

On-Demand Self-Service.

A consumer can unilaterally provision computing capabilities, such as server time and network storage, as needed automatically without requiring human interaction with each service provider.

Broad Network Access.

Capabilities are available over the network and accessed through standard mechanisms that promote use by heterogeneous thin or thick client platforms (e.g., mobile phones, tablets, laptops, and workstations).

Resource Pooling.

The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, and network bandwidth.

Rapid Elasticity.

Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured Service.

Cloud systems automatically control and optimize resource use by leveraging a metering capability (typically on a pay-per-use or charge-per-use basis) at some level of abstraction appropriate to the type of service (e.g., storage, processing, bandwidth, and active user accounts). Resource usage can be monitored, controlled, and reported, providing transparency for both the provider and consumer of the utilized service.

Service Models may include the following:

Software as a Service (SaaS).

The capability provided to the consumer is to use the provider's applications running on a cloud infrastructure. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

Platform as a Service (PaaS).

The capability provided to the consumer is to deploy onto the cloud infrastructure consumer-created or acquired applications created using programming languages, libraries, services, and tools supported by the provider. The consumer does not manage or control the underlying cloud infrastructure including network, servers, operating systems, or storage, but has control over the deployed applications and possibly configuration settings for the application-hosting environment. This capability does not necessarily preclude the use of compatible programming languages, libraries, services, and tools from other sources Infrastructure as a Service (IaaS).

The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls).

Deployment Models may include the following:

Private Cloud.

The cloud infrastructure is provisioned for exclusive use by a single organization comprising multiple consumers (e.g., business units). It may be owned, managed, and operated by the organization, a third party, or some combination of them, and it may exist on or off premises.

Community Cloud.

The cloud infrastructure is provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public Cloud.

The cloud infrastructure is provisioned for open use by the general public. It may be owned, managed, and operated by a business, academic, or government organization, or some combination of them.

Hybrid Cloud.

The cloud infrastructure is a composition of two or more distinct cloud infrastructures (private, community, or public) that remain unique entities, but are bound together by standardized or proprietary technology that enables data and application portability (e.g., cloud bursting for load balancing between clouds).

The presently disclosed subject matter may in some embodiments enable cloud consumers to benefit from one or more of the characteristics mentioned above as well as benefit from one or more other features such as security or stability which are not promised characteristics. Depending on the embodiment, management software relating to the subject matter may or may not be provided as a service in a cloud environment.

The disclosure presents some embodiments of systems, methods and computer program products relating to an overlay network in a cloud environment. In some cases of these embodiments, a management machine may manage an overlay network. Machine(s), which may be provided by cloud provider(s), may be added to or removed from the overlay network. Data relating to a machine may be gathered and configuration data may be determined, for example when the machine is being added to the overlay network. A device associated with a user authorized for the overlay network may connect to the overlay network. The overlay network may include one or more secure tunnels wherein a private IP address or public IP address may encapsulate an overlay IP address.

An overlay network may be a network which is on top of another (underlying) network. For instance the underlying network may include one or more networks of one or more cloud providers. The underlying network may additionally or alternatively, for instance, include one or more networks that are not cloud provider networks. However, the subject matter does not limit the type of underlying network which may vary depending on the embodiment. A logical connection in the overlay network may include one or more physical (layer) connections in the underlying network. Therefore when the term "connection", "connect", or a variant thereof, is used herein with reference to the overlay network it should be understood to refer to a logical connection in the overlay network. Depending on the embodiment, an overlay network may include one or more machines. Herein, the term machine should be construed to mean a physical or virtual machine, unless explicitly stated otherwise. Herein, the term "cloud provider" should be construed to refer to a provider in accordance with any cloud computing service model, such as described above. Herein, the term "cloud consumer" should be construed to refer to a consumer in accordance with any cloud computing service model, such as described above. Not all of the machines in an overlay network may necessarily be included in the overlay network on a fixed basis. For instance, one or more machines (e.g. devices) may connect to and disconnect from the overlay network as appropriate.

Although not necessarily so, in some embodiments the overlay network may be secured whereas the underlying network may be unsecured (or may not be as secured as the overlay network). Therefore in embodiments where the overlay network is secured, if routing over an unsecured network may be problematic, routing over the overlay network may in some cases provide a solution.

A machine provided by a cloud provider may be referred to herein as being in a cloud. For any overlay network, one or more of the machines in the overlay network may be included in one or more cloud(s). Depending on the embodiment, the cloud(s) may be public cloud(s) or any other type(s) of cloud(s) described above.

FIG. 1 illustrates a topology an overlay network 100 including a plurality of machines, in accordance with some embodiments of the presently disclosed subject matter.

Within a cloud 110, one or more machines may be included in overlay network 100. For the purpose of illustration only, two web servers 120 and 140, one application server 130, one database server 150, and one gateway 160 are illustrated in cloud 110 as being included in overlay network 100. Even though depending on the embodiment a gateway may or may not be a server (e.g. a cloud server), for clarity purposes, a gateway is referred to herein as a gateway. Depending on the embodiment, a cloud such as cloud 110 which includes machine(s) in the overlay network, may or may not also include one or more machine(s) not in the overlay network (of any type(s)). For instance in FIG. 1, two machine(s) 115 and 125 are illustrated as being in cloud 110 but not in overlay network 100. FIG. 1 also illustrates three machines which are devices 175, namely device 170, device 180, and device 190. Although devices 175 are illustrated in the form of a user device that is a laptop, depending on the embodiment any device 175 may be any user device or input/output device, as appropriate. Depending on the embodiment, there may or may not be machine(s) included in overlay network 100 which are outside a cloud. In embodiments where machine(s) outside of any cloud may be included in overlay network, one or more machines may be included. For instance, there may be one or more gateway(s), server(s) or device(s) outside of any cloud which are included in overlay network 100. For the purpose of illustration only, one machine which is a device, namely device 170 associated with a user authorized for network 100, is illustrated in FIG. 1 as being outside of cloud 110 but included in overlay network 100, for example connecting to and disconnecting from overlay network 100 as appropriate. Depending on the embodiment, an overlay network may include connections between any gateway and one or more non-gateway machines, between various gateways, or between various non-gateway machines. In FIG. 1 the connections between various machines in overlay network are shown by thick arrows. As described below a connection may in some embodiments include a secure tunnel, and therefore in these embodiments overlay network 100 may comprise one or more secure tunnels.

In the illustrated embodiments, devices 180 and 190 are shown as not part of overlay network 100. However device 180 (or the associated user) may be approved to access web server 140, for instance via an Hypertext Transfer Protocol (HTTP) (illustrated by a thinner arrow). Device 190 (or the associated user), on the other hand is not approved to access any of the servers in overlay network 100 (and therefore the thinner arrow from device 190 does not lead to any machine in overlay network 100). Depending on the embodiment there may be zero or more devices which may be included in overlay network 100, zero or more devices which may not be part of overlay network 100 but may be approved (or associated users may be approved) to access one or more servers in overlay network 100 via one or more protocols, and zero or more devices which may not be approved (or associated users may not be approved) for access.

When it is stated herein that a machine (of any type) is in an overlay network, is included in an overlay network, is part of an overlay network, or variants thereof, it may not necessarily mean that the machine has already been connected to the overlay network. For instance in some cases the machine may have already been connected to the overlay network, whereas in other cases the machine may have been designated to be added to the overlay network (for instance by being indicated or determined in stage 302 or 304 respectively) or may be in the process of getting connected, but may not yet be connected to the overlay network.

Figure 5:
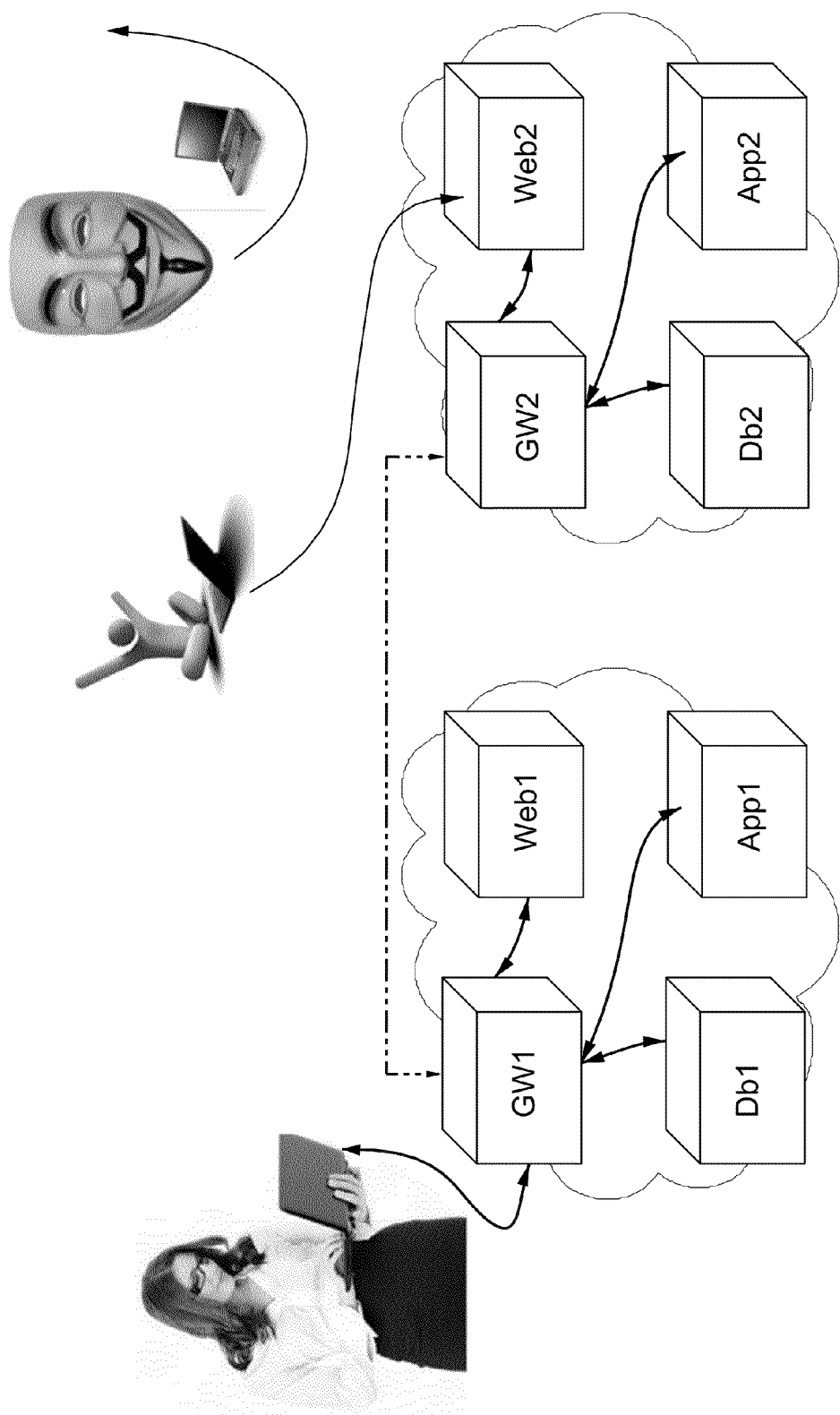
FIG. 5 illustrates another topology of an overlay network which includes machines in two clouds, in accordance with some embodiments of the presently disclosed subject matter.

For the purpose of further illustration only, FIG. 5 illustrates another topology of an overlay network which includes machines in two clouds, in accordance with some embodiments of the presently disclosed subject matter.

The subject matter is not bound by any particular topology of an overlay network. For instance, the subject matter is not bound by any particular number of cloud(s), if any, which may include machine(s) in a given overlay network, by any specific number or type(s) of machine(s), if any, within the cloud(s) that may be included in a given overlay network, or by any certain number or type(s) of machine(s), if any, outside the cloud(s) that may be included in a given overlay network. In other embodiments, the topology of an overlay network may be slightly or substantially different than described and illustrated herein.

Depending on the embodiment, any cloud which includes machine(s) in a given overlay network, may or may not also include machine(s) that are not part of the same overlay network.

Figure 2:
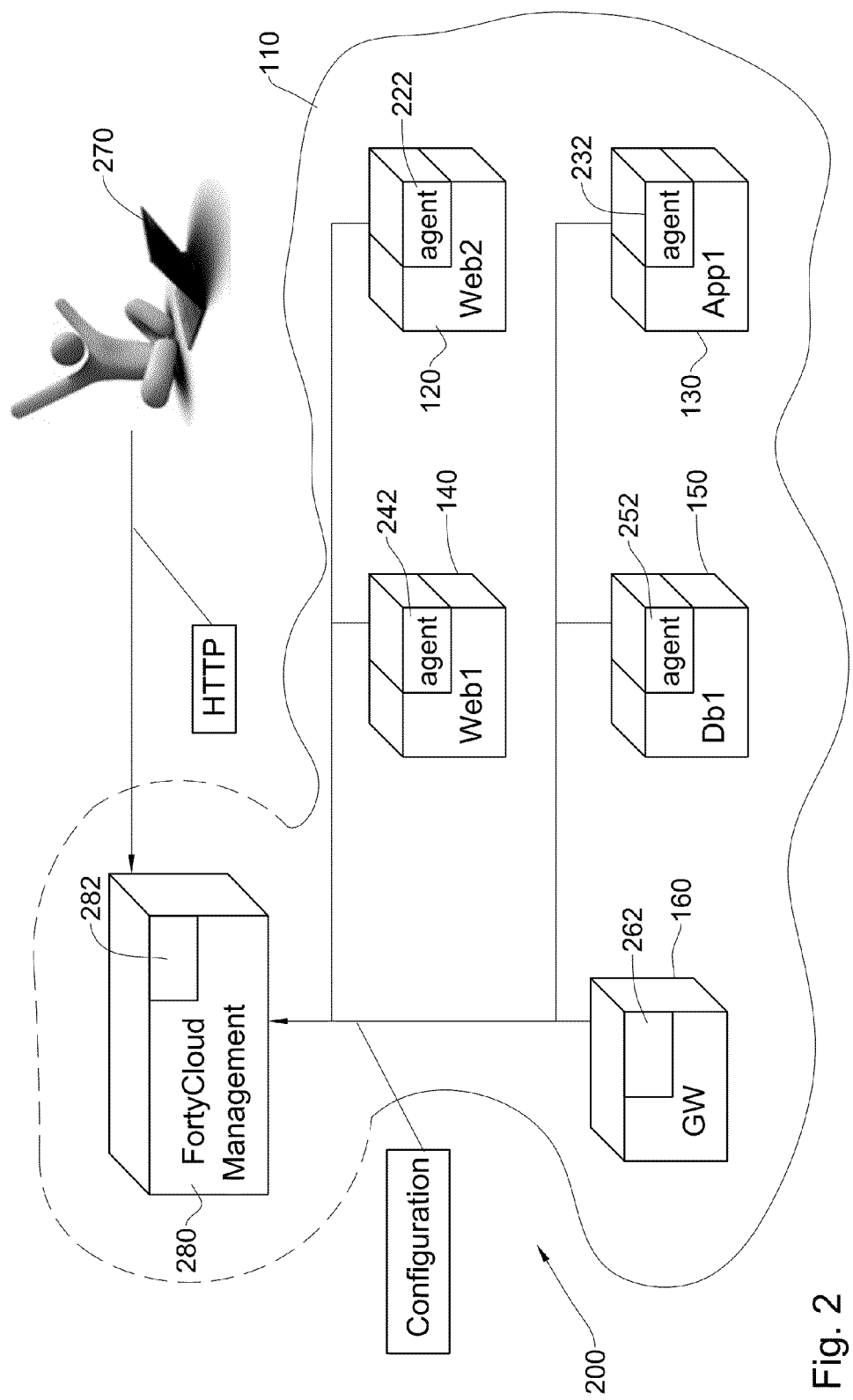
FIG. 2 illustrates a configuration system, in accordance with some embodiments of the presently disclosed subject matter.

FIG. 2 illustrates a configuration system 200, in accordance with some embodiments of the presently disclosed subject matter. Configuration system 200 may be used to configure an overlay network (e.g. to add machine(s) on a fixed basis, to remove such machine(s), with reference to other activity/ies, with reference to policy/ies, etc). The term "fixed basis" should be understood in the sense of "set", meaning that a machine being added to an overlay network on a fixed basis becomes part of the overlay network until removed by configuration system 200, if at all, and therefore the machine may or may not be permanently part of the overlay network.

Depending on the embodiment, there may be one or more parties associated with configuration system 200, depending on the number of function(s) performed by each party. Any party may be, for example, a company, an individual, an organization, etc. For instance, a party associated with the overlay network may also be a cloud provider (e.g. if the cloud is a private or community cloud) or may not be a cloud provider (e.g. if the cloud is a public cloud). A party associated with the overlay network may be the same party as the party which administers management software 282 or may be a different party. A party which administers management software 282 may or may not also be a cloud provider.

In the illustrated embodiments, configuration system 200 includes a management machine 280. Depending on the embodiment management machine 280 may or may not be a server, but for clarity purposes, management machine 280 is referred to herein as a management machine. Depending on the embodiment, management machine 280 may be inside a cloud or outside a cloud and therefore the part of the illustrated cloud 110 which surrounds management machine 280 is drawn as a broken line.

Possibly, management machine 280 may include, or may be capable of accessing, a database which includes data relating to different overlay networks which are managed by management machine 280. For instance, the database may list for each overlay network machines such as servers, devices, or gateways which are part of the overlay network.

Management machine 280 may be made up of any combination of software, firmware or hardware capable of performing the operations as defined and explained herein. Although not necessarily so, management machine 280 may include in some embodiments management software 282 with program code written in any appropriate programming language which may be capable of configuring management machine 280 for the desired purposes (e.g. to perform operations defined and explained herein). Additionally or alternatively, management machine 280 may include in some embodiments any combination of software, hardware or firmware conventionally found in a machine.

For the purpose of illustration only, one management machine 280 is illustrated and described. However reference to management machine in the single form should be construed to refer to embodiments where there is one management machine or to embodiments where there is a plurality of management machines, as appropriate. Management machine 280 may be concentrated in one location, or may be dispersed over more than one location. For instance, in embodiments where management machine 280 is described as being included in a cloud, management machine 280 may be concentrated in one cloud, may be dispersed over one cloud, or may be dispersed over a plurality of clouds. In some embodiments where management machine 280 is included in a cloud, management software 282 may be administered by a cloud provider (which may or may not be a party associated with an overlay network) and therefore management software 282 may be considered as being provided as a service in a cloud environment to consumer(s) (e.g. to a one or more party/ies associated with one or more overlay network(s)). However in other embodiments where management machine 280 is included in a cloud, management software 282 may be administered by a party which is not a cloud provider but is instead a cloud consumer, such as a party associated with an overlay network or a party not associated with any overlay network.

Any machine which is a user device or input/output device such as device 270 (which may or may not be the same as any device 175), that may be capable of communicating with management machine 280 in order to configure an overlay network (e.g. by accessing management software 282), may be considered to be part of configuration system 200. Although only one device 270 is illustrated in FIG. 2 there may be zero or more devices 270 in configuration system 200 which may be capable of communicating with management machine 280 and therefore usage of the single form of the term "device" 270 herein should be construed to cover embodiments with a single device or embodiments with a plurality of devices, as appropriate. Although device 270 is illustrated in FIG. 2 in the form of a user device that is a laptop, depending on the embodiment, device 270 may be in any user device or input/output device, as appropriate. Although device 270 is assigned a different label than device 175 depending on the embodiment, there may or may not be device(s) which may include both functionality ascribed herein to device 175 (e.g. to device 170, 180 or 190) and functionality ascribed herein to device 270. In some embodiments, management machine 280 may be accessible from device 270 through a thin client interface such as a web-browser where the application protocol may be the HTTP or Hypertext Transfer Protocol Secure (HTTPS). However, in other embodiments, management machine 280 may be accessible from device 270 via a local network or local physical connection. Depending on the embodiment, device 270 which is used to communicate with management machine 280 may be associated with a party which is associated with an overlay network and which also administers management software 282, may be associated with a party which is associated with an overlay network, may be associated with a party which administers management software 282, or may be associated with either, or may be associated with both.

Configuration system 200 may also include for each overlay network, one or more gateways in the overlay network. For instance configuration system 200 may include at least one gateway per cloud with at least one machine in the overlay network. Additionally or alternatively, any gateway may be at least partly outside a cloud.

Configuration system 200 may also include for each overlay network one or more server(s) in the overlay network (and other machine(s) connected on a fixed basis to the overlay network, if any).

In FIG. 2, for instance, gateway 160, and servers 120, 130, 140, and 150 in cloud 110 are shown as being part of configuration system 200.

Any gateway in configuration system 200 such as gateway 160 may be made up of any combination of software, firmware or hardware capable of performing the operations as defined and explained herein. Although not necessarily so, in some embodiments any gateway such as gateway 160 may include gateway software such as gateway software 262 with program code written in any appropriate programming language which may be capable of configuring the gateway for the desired purposes (e.g. to perform operations defined and explained herein). Additionally or alternatively, any gateway such as gateway 160 may include in some embodiments any combination of software, hardware or firmware conventionally found in a gateway.

Any server in configuration system such as servers 120, 130, 140, and 150 may be made up of any combination of software, firmware or hardware capable of performing the operations as defined and explained herein. Although not necessarily so, any server may include an agent (software) with program code written in any appropriate programming language (e.g. Java) which may be capable of configuring the server for the desired purposes (e.g. to perform operations defined and explained herein). Additionally or alternatively, any server may include in some embodiments any combination of software, hardware or firmware conventionally found in a server. For instance, in FIG. 2 agent 222 corresponds to web server 120, agent 232 corresponds to application server 130, agent 242 corresponds to web server 140, and agent 252 corresponds to database server 150.

Although not necessarily so, in some embodiments any server (e.g. 120, 130, 140, 150), gateway (e.g. 160) or other machine in the overlay network on a fixed basis (if any), may be capable of communicating with management machine 140 by way of a secured protocol such as HTTPS.

Although not necessarily so, in some embodiments device 270 and one or more gateways or servers in configuration system 200 may be capable of communicating with one another (e.g. by way of remote protocol such as Secure Shell (SSH)), for instance relating to gateway software or agent software. For example, in some embodiments assuming management software 282 is administered by a party that is not associated with the overlay network (e.g. 100) currently being configured, a device (e.g. 270) associated with a party which administers management software 282 may communicate with a gateway regarding gateway software (e.g. in order to provide program code for requesting gateway software), whereas a device (e.g. 270) associated with a party associated with overlay network 100 may communicate with a server regarding agent software (e.g. in order to provide program code for requesting gateway software).

The subject matter is not bound by any particular configuration system and in some other embodiments the configuration system may be slightly or substantially different than described and illustrated herein.

Figure 3:
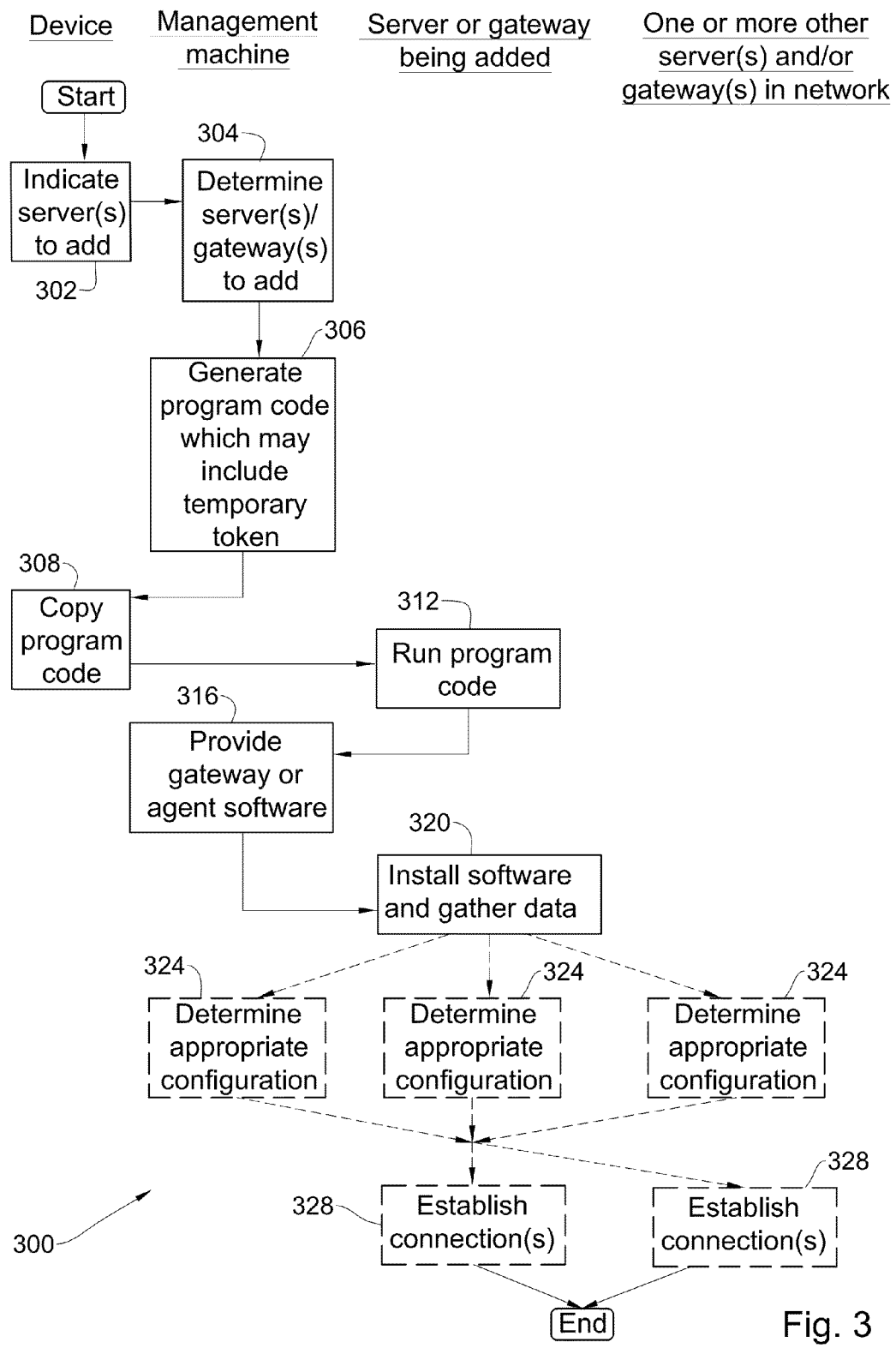
FIG. 3 illustrates a method of configuring an overlay network, in accordance with some embodiments of the presently disclosed subject matter.

FIG. 3 illustrates a method 300 of configuring an overlay network (e.g. overlay network 100 or any other overlay network), in accordance with some embodiments of the presently disclosed subject matter. Method 300 may be performed by one or more elements of configuration system 200. Communication between elements of configuration system 200 in order to perform method 300 may typically although not necessarily be by way of a secured protocol such as HTTPS.

Some embodiments of configuration of the overlay network will now be described with reference to adding one or more machine(s) on a fixed basis to an overlay network such as overlay network 100. For the purpose of illustration only, adding will be described with respect to one or more server(s) or gateway(s).

In the illustrated embodiments, in stage 302 device 270 may indicate which server(s) to add. Any server being added may or may not be provided by a cloud provider, and if provided by a cloud provider, not necessarily by the same cloud provider as another server. Additionally or alternatively device 270 may indicate how it is desired that each server to be added connect to the overlay network.

The subject matter does not limit the manner in which server(s) to be added may be indicated. Although not necessarily, data relating to each machine to be added may be provided. Examples of such data may include any of the following: internal (i.e. for the overlay network) Domain Name System (DNS) name if not desired to be generated automatically, overlay IP address if not desired to be generated automatically, security context (e.g. whether machine authentication token desired or not), role(s) of machine (e.g. for access control), etc. Device 270 may also provide an indication to generate program code (e.g. a script). See stage 306 below regarding program code generation.

In embodiments where desired connection(s) may be indicated, the subject matter does not limit how the desired connection(s) may be indicated. For instance, a desired connection may be indicated graphically (e.g. drawing a line between representations of machines to symbolize a desired connection between the machines), by way of alphanumeric input (e.g. "node1 connect node2"), by listing in a connection table, or by way of machine selection (e.g. selecting representations of the machines one after another if it is desired that there be a connection between the machines). In other embodiments, desired connection(s) may additionally or alternatively be indicated in any appropriate manner.

Although not necessarily so, in some embodiments device 270 may access management software 282 in management machine 280 in order to indicate which server(s) to add. Additionally or alternatively although not necessarily so, in some embodiments device 270 may access management software 282 in management machine 280 in order to indicate how it is desired that each added server connect to the overlay network.

In some embodiments, stage 302 may be omitted, for instance if management machine 280 may determine which server(s) to add without first receiving indication(s). In some embodiments, not all desired connection(s) may be indicated, for instance if a connection is evident without indication.

In the illustrated embodiments, in stage 304, management machine 280 may determine that one or more server(s) is/are to be connected to an overlay network such as overlay network 100. Any server being added may or may not be provided by a cloud provider, and if provided by a cloud provider, not necessarily by the same cloud provider as another server. Additionally or alternatively, management machine 280 may determine how it is desired that the added server(s) connect to the overlay network.

Depending on the embodiment, management machine 280 may make the determination at least partly based on indication(s) received from stage 302, or may make the determination without receiving indication(s), for instance if stage 302 was omitted.

In some embodiments, some or all of the server(s) to be added may not necessarily have been indicated in stage 302, for instance if management machine 280 may make the determination of which server(s) to add without receiving indication(s).

In some embodiments, some or all desired connection(s) may not necessarily have been indicated in stage 302, for instance if a particular desired connection is evident. For example, if each added server connects to a gateway as a default, this connection may not necessarily have been indicated because management machine 280 may determine a default desired connection in some embodiments without receiving an indication of the connection.

Depending on the embodiment, management machine 280 may or may not determine to add one or more gateway(s) to the overlay network if server(s) are being added. For instance, in some embodiments, when the first server is at least being added to the overlay network, management machine 280 may also determine to add at least one gateway to the overlay network. Additionally or alternatively, for instance, in embodiments with at least one gateway per cloud, if any server currently being added is in a cloud which does not yet include a machine in the overlay network, then management machine 280 may also determine that at least one gateway is to be added to the overlay network for each cloud which includes at least one server being added but which does not yet include a machine in the overlay network. The gateway(s), may or may not be capable of functioning as any of the following: a Virtual Private Network (VPN) concentrator, an internal router, a DNS server, etc.

Depending on the embodiment, if a plurality of server(s) or gateway(s) is being added then stages 306 to 328 may be performed for each server or gateway being added. The performance of these stages for a given server or gateway being added may or may not overlap in time with the performance of these stages for one or more other server(s) or gateway(s) being added, depending on the embodiment. For simplicity of description, stages 306 to 328 will be described with reference to a single machine (gateway or server) being added.

In the illustrated embodiments in stage 306, management machine 280 may generate program code (e.g. a script) for the server or gateway being added. In some embodiments, the generated program code may include a (generated) temporary machine authentication token, whereas in other embodiments, the generated program code may not necessarily include a temporary machine authentication token, depending on the level of trust desired for the overlay network. Depending on the embodiment, generated program code may be the same (other than the temporary token) or may be different for a gateway versus a server, for different servers, or for different gateways. The program code may or may not be provided to device 270, for instance depending on whether or not stage 308 is being performed.

For instance, generated program code may be provided to device 270 (e.g. associated with a party which associated with the overlay network, associated with a party administering management software 282, or associated with a party which is associated with the overlay network and which administers management software 282) which will then perform stage 308. Although not necessarily so, in some embodiments, if the party associated with the overlay network is not the same as the party administering management software 282, the program code for a gateway may be provided to a device associated with a party administering management software 282 whereas the program code for a server may be provided to a device associated with a party associated with the overlay network.

In the illustrated embodiments, in stage 308, the generated program code may be provided by device 270 to the server or gateway being added, for instance by copying the generated program code to a command line interface on the corresponding server or gateway (e.g. using a remote protocol such as SSH).

In other embodiments, stage 308 may be omitted and the generated program code may be caused to run in stage 312 in any appropriate manner. For instance, management machine 280 may cause the generated program code to run e.g. by way of a remote protocol such as SSH.

In the illustrated embodiments, in stage 312, the generated program code may be run on the server or gateway being added. The running of the program code may cause the server or gateway to request agent software (e.g. 222, 232, 242, 252) or gateway software (e.g. 262).

In some embodiments, if the program code included a temporary machine authentication token, then once the program code has been run on the server or gateway which is being added to the overlay network, the server or gateway may provide the temporary token to management machine 250, for authentication purposes.

In the illustrated embodiments, in stage 316, management machine 280 may provide gateway software 262 or agent software (e.g. 222, 232, 242, 252) to the gateway or server which is being added. If a temporary machine authentication token was provided in stage 312 by the gateway or server being added to management machine 280, then management machine 280 may attempt to authenticate the gateway or server and only if authenticated, provide the gateway or agent software. In embodiments where the gateway or server was authenticated by way of the temporary machine authentication token, management machine 280 may provide a replacement longer expiration machine authentication token to the gateway or server.

Alternatively, in some embodiments, gateway software 262 or agent software (e.g. 222, 232, 242, 252) may be provided from elsewhere than management machine 280. Depending on the embodiment, the provision from elsewhere may or may not be conditional on prior authentication of the gateway or server by management machine 280.

In the illustrated embodiments in stage 320, the gateway or server being added which receives the gateway or agent software may install the software. The installed software may, in some embodiments, configure the gateway or server to perform operations described herein. For instance, the gateway or server being added may gather data including any of the following: Internet Protocol (IP) address(es) (e.g. private, public) associated with the gateway or server, hostname, encryption keys (e.g. public keys, symmetrical keys) or other cryptographic data which may be used to protect networking communication, cloud provider networking information, or any other configuration data regarding the gateway or server which may enable determination of configuration data for connecting the gateway or server to the overlay network, etc. For instance, the appropriate configuration data for a particular desired connection may depend at least partly on the configurations of the infrastructure (e.g. server, gateway) on each side of the connection. A private IP address of a machine provided by a cloud provider may be an IP address of the machine within the network of the cloud provider. In some embodiments, if the server or gateway being added does not yet have a public key, a public-private key pair may be generated at this stage, but in other embodiments this may not necessarily occur. The term "gather", "gathering" or variants thereof is used herein with respect to the data because of the common usage of the term with respect to data, but the term may or may not imply that the data was initially dispersed.

Depending on the embodiment, the gateway or server being added may provide the gathered data to management machine 280 so that management machine 280 may perform functions such as determining configuration data for connecting the machine to the overlay network (e.g. in accordance with the desired connection(s)), including an overlay IP address or an internal DNS name, etc; if a server is being added, the server may provide the gathered data to an associated gateway so that the associated gateway may perform functions such as determining configuration data for connecting the server to the overlay network (e.g. in accordance with the desired connection(s)) including an overlay IP address or an internal DNS name for the server; or the gateway or server being added may use the gathered data to perform functions such as determining an configuration data for connecting to the overlay network (e.g. in accordance with the desired connection(s)) including overlay IP address or an internal DNS name, etc. (Although for ease of description, data may be referred to herein as gathered data, from the point of view of another machine which may receive such data, the data may be considered by the other machine to be received data). Although not necessarily so, in some embodiments, a gateway associated with a server being added may be a gateway to which the server will connect. In some of these embodiments, for instance, a server may connect to a gateway associated with the same cloud as the server.

The gathering of data by a machine (i.e. automatically) such as by a gateway or server (when the gateway or server is being added or at any other time) rather than manual data gathering may be advantageous in some embodiments. For instance, in a cloud environment, the configuration of a machine (e.g. including whether or not there is a private interface for a gateway or server) may vary depending on the cloud provider which is providing the infrastructure or may vary depending on one or more other factors. The party associated with the overlay network may or may not be a cloud provider. If not, the associated party may not be able to control or may not necessarily be aware of configuration data (e.g. IP addresses, DNS names, keys, other data, etc) relating to the different machines in a cloud. Even if the party associated with the overlay network is a cloud provider, the possible variation in configuration of a machine (e.g. depending on one or more other factors) may not be so easy to master.

In the illustrated embodiments in stage 324 there may be a determination of configuration data for connecting the gateway or server being added (e.g. as desired) to the overlay network, including an overlay IP address for a gateway or server being added. The determined configuration data may or may not also include an internal DNS name for the server or gateway being added or other data. Although not necessarily so, in some embodiments the determined configuration data may be at least partly dependent on data gathered in stage 320. The determined configuration data may or may not be also at least partly dependent on data gathered relating to at least one other machine (e.g. gathered by the at least one other machine) in the overlay network. In embodiments where determined configuration data is at least partly dependent on gathered data, at least part of the determined configuration data may or may not be identical to gathered data. The determination of configuration data may be made by management machine 280, by the server or gateway being added, or by one or more other machine(s) in the overlay network. The boxes around stage 324 as well as the arrows to and from the boxes are broken to indicate alternatives (which may not necessarily be exclusive of one another). Typically although not necessarily the allocated overlay IP address for a server in a cloud may be close to the allocated overlay IP address of the gateway associated with the same cloud.

In some embodiments, the overlay IP address allocated to the gateway or server being added may not conflict with any other allocated overlay IP address (in the same overlay network). Additionally or alternatively, the overlay IP address allocated to the gateway or server may in some embodiments not conflict with any private IP address in any network of any cloud provider with at least one machine in the overlay network. Not conflicting with any private IP address in any network of any cloud provider with at least one machine in the overlay network may in some embodiments include not conflicting with the private IP address of the gateway or server being added, not conflicting with the private IP address(es) of any other machine(s) in the overlay network, and not conflicting with the private IP address(es) of machine(s) not in the overlay network but in the same cloud(s) as machine(s) in the overlay network. In some embodiments, an internal DNS name, if allocated to the gateway or server being added may not conflict with any other internal DNS name (in the same overlay network). Additionally or alternatively, the internal DNS name if allocated to the gateway or server may in some embodiments not conflict with any hostname in any network of any cloud provider with at least one machine in the overlay network.

For instance in some of these embodiments, the allocation of overlay IP addresses may be centrally controlled by management machine 280. Therefore in stage 324, management machine 280 may allocate an overlay IP address (and optionally an internal DNS name) for the gateway or server being added. For example, management machine 280 may allocate an overlay IP address to a server or gateway being added which may not conflict with any other allocated overlay IP address (in the same overlay network), nor with any private IP address in any network of any cloud provider with at least one machine in the overlay network. In embodiments with an internal DNS name, management machine 280 may for example allocate an internal DNS name to a server or gateway being added which may not conflict with any other internal DNS name (in the same overlay network), or with any hostname in any network of any cloud provider with at least one machine in the overlay network.

Alternatively, in some of these embodiments, the allocation of overlay IP addresses (and optionally internal DNS names) may not necessarily be completely centrally controlled. For example, management machine 280 may allocate an overlay IP address (or internal DNS names) to a server or gateway being added that may not conflict with any other allocated overlay IP address (or internal DNS names) in the same overlay network, nor with any private IP address (or host name) in any network of any cloud provider with at least one machine in the overlay network (ignoring any conflict with the private IP address or host name of the server or gateway being added), and the server or gateway being added may determine if there is a conflict with its own private IP address (or hostname).

Alternatively, in some of these embodiments, if a gateway is being added management machine 280 may allocate an overlay IP address (and optionally internal DNS name) as well as a pool of overlay IP addresses (and optionally internal DNS names) to a gateway which may not conflict with any other allocated overlay IP address (or internal DNS names) in the same overlay network, nor with any private IP address (or host name) in any network of any cloud provider with at least one machine in the overlay network, whereas if a server is being added the gateway may allocate an overlay IP address (and optionally internal DNS address) from the pool to the server.

Alternatively, in some of these embodiments the gateway or server which is being added may allocate to itself an overlay IP address (and optionally internal DNS name) for itself which may not conflict with any other allocated overlay IP address (or internal DNS names) in the same overlay network, nor with any private IP address (or host name) in any network of any cloud provider with at least one machine in the overlay network.

For instance, assume that a private IP address of a server is 172.16.4.5 and the cloud provider's subnet is 172.16.0.0/12. In this instance, the server is assumed to be included in an overlay network. The private IP address of the server may have been gathered, for example when the server was being added to the overlay network or at any later time. In this instance, it may be determined that the "172.16.0.1" indicates the beginning of a private IP address within the network of the cloud provider which provides the server. For simplicity's sake it is assumed that in this instance there is only one cloud provider which provides machine(s) that may be included in the overlay network. In other cases, a cloud provider may use a subnet for certain purposes such as indicating a certain type of machine, e.g. DNS servers. In order not to conflict with the cloud provider's subnet, the overlay IP address allocated to any machine in the overlay network may not be included in subnet 172.16.0.0/12. Additionally or alternatively, in order to not conflict with any private IP addresses of the cloud provider, the allocated overlay address to any machine in the overlay network may not be in the range of 172.16.0.0/16, but may instead be with 172.30.0.0/16, which is normally not in use by the cloud provider.

Depending on the embodiment, there may or may not be a determination of other configuration data (besides the overlay IP address or internal DNS name of the machine being added) for connecting the machine being added to the overlay network (e.g. in accordance with the desired connection(s)). In some embodiments where other configuration data is determined, management machine 280 may determine other configuration data. Additionally or alternatively, in some embodiments where other configuration data is determined, a server or gateway being added may determine other configuration data. Additionally or alternatively, in some embodiments where other configuration data is determined and a server is being added, a gateway associated with the server being added may determine other configuration data. If management machine 280 is determining other configuration data for a gateway or server being added, or a gateway is determining other configuration data for a server being added, then in some embodiments management machine 280 or the gateway may provide some or all of the other determined configuration data to the machine being added.

For instance, other configuration data for connecting the machine being added to the overlay network (e.g. in accordance with the desired connection(s)), which may be determined by the machine being added or provided to the machine being added, may include in some embodiments any of the following data: overlay IP addresses of other machine(s) in the overlay network, private IP addresses of other machine(s) in the overlay network, public IP addresses of other machine(s) in the overlay network, IP routing, encryption keys or other cryptographic data of other machine(s) in the overlay network, data relating to machine authentication tokens of other machine(s) in the overlay network, hostname(s) of other machine(s) in the overlay network, internal DNS name(s) of other machine(s) in the overlay network, cloud provider networking information, policy regarding private/public interface, policy regarding access control, properties regarding a secure tunnel (e.g. Internet Protocol Security (IPsec)) such as which port to use, any other data useful for connecting the machine being added to the overlay network (e.g. in accordance with the desired connection(s)), etc.

Depending on the embodiment, a machine (e.g. one or more of management machine, gateway or server) which may determine configuration data for connecting the machine being added to the overlay network (e.g. in accordance with the desired connection(s)) may or may not provide some or all of the determined configuration data to one or more other machines (e.g. server(s) or gateway(s)), in the overlay network. For instance, depending on the embodiment, a machine (e.g. management machine, gateway, server) which may have allocated the overlay IP address (or internal DNS name) for the gateway or server being added may or may not provide the allocated overlay IP address (or internal DNS name) to one or more other machines in the overlay network. Additionally or alternatively, for instance depending on the embodiment, a machine (e.g. management, gateway, server) which may have determined other configuration data for connecting the machine being added to the overlay network may or may not provide some or all of the determined other configuration data to one or more other machines in the overlay network. For instance other configuration data which may or may not be provided to one or more other machines may include any of the following data: public IP address of the server or gateway being added, private IP address of the server or gateway being added, IP routing to the server or gateway being added, encryption keys or other cryptographic data of the server or gateway being added, data relating to a machine authentication token of the server or gateway being added, hostname of the server or gateway being added, cloud provider networking information, policy regarding private/public interface, policy regarding access control, properties regarding a secure tunnel (e.g. (IPsec)) such as which port to use, any other data useful for connecting the machine currently being added to the overlay network (e.g. in accordance with the desired connection(s)), etc.

Depending on the embodiment, a gateway may or may not receive (e.g. from management machine 280 which may have allocated the pool) or may or may not allocate to itself a pool of overlay IP addresses which may be assigned by the gateway to device(s) (e.g. 170) which connect to and disconnect from the overlay network as appropriate. In some embodiments, the overlay IP addresses may not conflict with one another, with any other overlay IP address in the overlay network, nor with any private IP address in any network of any cloud provider with at least one machine in the overlay network. For instance, in some embodiments when the gateway is being added the gateway may receive or allocate an initial pool of overlay IP address(es) and the pool may be updated if necessary, e.g. due to new or resolved conflicts with private or overlay IP addresses, due to fewer or more overlay IP address(es) being needed for allocation to device(s), etc. Depending on the embodiment, a gateway may or may not receive (e.g. from management machine 280 or from the server(s)) hostname(s) for one or more server(s) in the overlay network, and the gateway may or may not receive (e.g. from management machine 280 which may have allocated the internal DNS name) or may or may not allocate internal DNS name(s) for these server(s). In embodiments where the gateway received the hostname(s) of server(s), and received or allocated internal DNS names for these server(s), the gateway may function for these servers as an internal DNS server. For instance, in some embodiments, the gateway may receive the host name, and may receive or allocate the internal DNS name as each of these server(s) is added to the overlay network.

In some embodiments it may be advantageous that configuration data for connecting may be automatically determined (i.e. by a machine) in stage 324 rather than manually determined. Automatic determination may be advantageous compared to manual determination, for instance because automatic determination may require better pre-planning, where different possible challenges may be anticipated in advance so that the configuration data may be determined automatically.

In the illustrated embodiments, in stage 328, the server or gateway being added may be connected to the overlay network in accordance with at least part of the configuration data determined in 324. Depending on the embodiment, the server or gateway being added, or one or more other machines in the overlay network, may establish connection(s) to connect the server or gateway being added to the overlay network. The boxes around stage 328 and the arrows to and from boxes 328 in FIG. 3 are broken to indicate alternatives, which may not necessarily be exclusive of one another. For instance, in some embodiments, the server or gateway being added may connect the machine to the overlay network, with or without the assistance of one or more other machine(s) in the overlay network. In some embodiments, in order to connect the server or gateway being added to the overlay network, one or more secure connection(s) may be established. For instance, any of the established connection(s) may be a secure tunnel such as IPsec or any other layer 3 solution (proprietary or non-proprietary) which may provide secure connectivity. The established routing for any connection may be any routing which may allow an overlay connection over an underlying network such as IP in IP or generic routing encapsulation GRE. For instance, a public IP address or a private IP address of the server or gateway being added may be used to encapsulate the overlay address of the server or gateway when routing to the server or gateway. (Depending on the embodiment, there may or may not be policy/ies for routing to or from the added server or gateway—see below). The usage of a secure tunnel and routing which allows an overlay connection, may allow the overlay network, if desired, to be secured. In embodiments with encryption keys or other cryptographic data, the keys or other cryptographic data may or may not be used to encrypt communication (e.g. IPSec communication) in the overlay network.

In some embodiments, if a gateway is being added to an overlay network which does not yet include any other machines, then at least stage 328 may wait until one or more connection(s) may be established with at least one other machine in the overlay network.

Depending on the embodiment, the establishment in stage 328 of at least one secure tunnel and routing which allows overlay connection(s), may allow the overlay network, if desired, to be secured in any of the following ways. For instance, the establishment may mean that packets may be encrypted, may mean that packets may be authenticated, or may mean that it may be less likely for packets to be intercepted or forged. Additionally or alternatively, a secured network may include at least one technique such as a firewall which may prevent unapproved traffic from outside the overlay network from accessing machine(s) in the overlay network.

In the illustrated embodiments, the description of method 300 may end with respect to addition of machine(s) to the overlay network.

Some embodiments of configuration of the overlay network will now be described with reference to removing one or more fixed basis machine(s) from an overlay network such as overlay network 100. For the purpose of illustration only, removing will be described with respect to one or more server(s) or gateway(s).

Assume that additionally or alternatively in stage 304 management machine 280 may determine that one or more server(s) is to be removed from the overlay network. For instance, device 270 may have indicated in stage 302 that server(s) is to be removed. The subject matter does not limit the manner in which server(s) to be removed may be indicated. Although not necessarily so, in some embodiments device 270 may access management software 282 in management machine 280 in order to indicate which server(s) to be removed.

In some embodiments, if a server determined to be removed is the last server associated with a particular gateway (e.g. the last server in the cloud associated with the gateway), then management machine 280 may or may not also determine that the associated gateway is to be removed.

Depending on the embodiment, if a plurality of server(s) or gateway(s) is being removed then the remainder of the removal process may be performed for each server or gateway. The performance of the removal process for each server or gateway being removed may or may not overlap in time with the performance of the removal process for one or more other server(s) or gateway(s) being removed, depending on the embodiment. In some cases, if the last server(s) associated with a gateway as well as the gateway are being removed, the remainder of the removal process for a gateway may be performed after the remainder of the removal process(es) for the associated server(s) but in other cases this may not necessarily be the order. For simplicity of description, the remainder of the removal process will be described with reference to a single machine (gateway or server) being removed. Additionally or alternatively, if it is determined to both add machine(s) and remove machine(s), the addition and removal may occur in any order, and may or may not overlap in time. However for simplicity of description, removal is being described after addition.

Depending on the embodiment, the machine being removed or one or more other machines in the overlay network may act to remove the machine. In some embodiments, after it has been determined that a machine is to be removed from the overlay network, management machine 280 may indicate to the machine being removed that the machine is to be removed from the overlay network. Therefore the machine being removed may remove itself from the overlay network. For instance, the machine may disconnect any connection(s) to any other machine(s) in the overlay network which may have been previously established. Additionally or alternatively, the machine being removed (e.g. server or gateway) may uninstall the agent or gateway software.

Depending on the embodiment, management machine 280 may or may not provide data relating to the machine being removed to one or more other machines in the overlay network. For instance, management machine 280 may or may not provide the overlay IP address of the machine being removed, internal DNS name of the machine being removed, private IP address of the machine being removed, public IP address of the machine being removed, IP routing relating to the machine being removed, encryption keys or other cryptographic data of the machine being removed, data relating to an authentication token of the machine being removed, hostname of the machine being removed, cloud provider networking information, policy regarding private/public interface, policy regarding access control, properties regarding a secure tunnel (e.g. (IPsec)) such as which port to use or any other data needed to disconnect from the machine being removed. For instance, each machine each machine (e.g. gateway or server) connected to the machine being removed may rely on at least part of the provided data in order to disconnect itself from the machine being removed.

Some embodiments of configuration of the overlay network will now be described with reference to activity/ies not necessarily related to addition or removal of one or more fixed basis machine(s) to or from an overlay network such as overlay network 100.

Depending on the embodiment, data relating to a machine (e.g. server, gateway) may or may not be gathered by the machine, periodically or upon certain event(s) (e.g. machine addition, machine removal, change in configuration of machine, change in configuration of connection, change in cloud including the machine, other relevant change, relevant event relating to machine run-time status, other relevant event etc) while the machine is part of an overlay network in existence or being managed by management machine 280. For instance, the machine may gather data such as described in stage 320 not only when being added to the overlay network but possibly also later in time. Depending on the embodiment, gathered data may be provided by the machine to any of the following: to management machine 280, to the associated gateway (if the machine is a server), to machines in the same cloud in the overlay network, to all machines in the overlay network, to relevant machine(s) in the overlay network (e.g. connected to the machine), etc. Gathered data which may be provided may include, for instance, IP address(es) (e.g. private, public), hostname, encryption keys (e.g. public keys, symmetrical keys) or other cryptographic data which may be used to protect networking communication, cloud provider networking information, any other configuration data regarding the machine which may enable determination of configuration data for connecting to the overlay network, etc. For example, depending on the embodiment, if data is gathered by the machine after addition of the machine, gathered data relating to the machine may be provided even if not updated from the last provision of data, or gathered data may be provided only if the data has been updated from the last provision.

Depending on the embodiment, configuration data such as overlay IP addresses, public IP addresses, private IP addresses, internal DNS names, hostnames, IP routing, encryption keys or other cryptographic data, data relating to machine authentication tokens, cloud provider networking information, policy regarding private/public interface, policy regarding access control, properties regarding a secure tunnel (e.g. (IPsec)) such as which port to use, any other data relating to the machine(s) in the overlay network, etc. may or may not be provided (e.g. by management machine 280 or whichever machine(s) may determine of configuration data) periodically or upon certain event(s) to machine(s) in the overlay network, for as long as the overlay network is in existence or being managed by management machine 280. Examples of event(s) may include machine addition, machine removal, change in machine configuration, change in connection configuration, change in cloud which includes a machine in the overlay network the machine, other relevant change, relevant event relating to machine run-time status, other relevant event etc. Although not necessarily so, in some embodiments configuration data may be determined (e.g. by management machine 280) at least partly based on data received (e.g. by management machine 280) from at least one machine provided by at least one cloud provider which is included in the overlay network. Depending on the embodiment, configuration data may be provided to all machine(s) in the overlay network not otherwise aware of the configuration data, or configuration data may not necessarily be provided to all machine(s) in the overlay network not otherwise aware of the configuration data. Although not necessarily so, in some embodiments, configuration data may be at least provided to at least one machine provided by at least one cloud provider in the overlay network. For instance, in stage 324 there may be a determination of configuration data whenever a machine may be added or removed, and additionally or alternatively there may be a determination of configuration data periodically or upon certain event(s) during the lifetime of the overlay network, or while management machine 280 may manage the overlay network. The determined configuration data may or may not be updated from the configuration data determined during the previous determination. Therefore in stage 328, connection(s) for instance may be established or removed whenever a machine is added or removed, and additionally or alternatively if configuration data has been updated, connection(s) may for instance be updated (e.g. connection(s) may be removed, connection(s) may be added, connection(s) may be changed, etc) in accordance with at least part of the updated configuration data.

Embodiments of configuration of the overlay network will now be described with additional reference to policy/ies for an overlay network such as overlay network 100.

Depending on the embodiment, there may or may not be policy/ies for an overlay network such as a policy relating to access control or a private/public interface policy/ies (also known as interface selection) which may affect routing in the overlay network. In embodiments with such policy/ies, one or more fixed basis machine(s) such as gateway(s) or server(s) in the overlay network may become aware of such policy/ies. For instance, initially when the overlay network is established policy/ies may be determined, and each time a machine is added, policy/ies may or may not be re-determined. Additionally or alternatively, for instance, policy/ies may or may not be re-examined or re-determined at any time such as upon a change in configuration of a machine, a change in connection in the overlay network, upon removal of a machine from the overlay network, upon a change in a cloud which includes a machine in the overlay network, upon other relevant change, upon a relevant event relating to machine run-time status, upon other relevant event, etc. In embodiments with policy/ies, policy/ies may or may not be translated into rules.

For instance, in some embodiments with a public/private interface policy, a public/private interface policy regarding usage of a public or private tunnel may be determined or re-determined, and then one or more machine(s) in the overlay network such as server(s) or gateway(s) may translate the policy into rule(s) to implement the policy. In some of these embodiments tunnels (e.g. IPsec) between machines in overlay network may be opened on both public and private IP addresses, if available, and the most appropriate tunnel in accordance with the policy may be used for the routing (e.g. using GRE). Depending on the embodiment, the policy of whether to use a public or private IP address to encapsulate the overlay IP address may vary and therefore the rule(s) implemented regarding delivery may vary. Although not necessarily so, private IP addresses may be preferred when either public or private may be used. For instance, within a cloud private tunnels may be used, and between clouds or between a cloud and outside a cloud public tunnels may be used. Continuing with this instance, in some cases if either a public or private IP address may be used, a network layer may attempt to use the private IP address whenever possible and only if using the private IP address is unsuccessful, may use the public IP address. In some embodiments, the ability to use private or public IP addresses for delivery may enhance the overlay network stability because the overlay network may not necessarily rely on one type of tunnel or another. For instance, in some cases the network provided by the cloud provider may fail and the public tunnel may necessarily be used.

For instance, in some embodiments with an access control policy, an access control policy may be determined or re-determined, and then the policy may be translated by one or more machines in the overlay network such as server(s) or gateway(s) into firewall rule(s) for instance for internal firewall(s) or external firewall(s) (e.g. based on IPtables or any other internal or external firewall technology). In other words, the machine(s) may translate the policy into firewall rule(s) for implementing the policy. (It is noted that in some embodiments an external firewall may not be relevant, for instance if data is encrypted). In some of these embodiments, an access control policy relevant to a particular server may relate to access by other server(s) in the overlay network to the particular server, so that other server(s) in the overlay network may access the particular server (via or not via a gateway), if in conformance with the policy. If, in other embodiments, there may be no access control policy regarding access by other server(s) in the overlay network to a particular server in the overlay network, then access by other server(s) (via or not via gateway) in the overlay network to the particular server may be unlimited, or may be limited but not based on which server is attempting access. Depending on the embodiment, an access control policy may additionally or alternatively relate to access by user(s) authorized for the overlay network, as will be described in more detail with reference to method 400. Depending on the embodiment, an access control policy may additionally or alternatively relate to access from outside the overlay network, such as from the underlying network to machine(s) in the overlay network. In some embodiments, such an access control policy may be particularly relevant for a machine provided by a cloud provider in the overlay network since there may be physical connection(s) between machines(s) in the same cloud regardless of whether physically connected machine(s) may or may not be in the overlay network. For example an access control policy relevant for a particular server in a particular cloud may indicate whether or not any access is allowed to the server from outside the overlay network and if yes then which traffic is approved (e.g. from another machine in the same cloud but which is not in the overlay network, from certain device(s) (e.g.) 180 via specific protocol(s), etc).

Although not necessarily so, in some embodiments an access control policy may be as described in co-pending application titled "Access control in a secured cloud environment", inventors: Noam Singer and Amir Naftali filed on even date herewith, which is hereby incorporated by reference herein.

In some embodiments, a policy (e.g. public/private interface, access control, etc) may be associated with machine(s) in the overlay network which may be affected by the policy, for instance through unique or group identifier(s) of the machine(s). For instance, for a server, possible unique identifier(s) may include server node, overlay IP address, etc, and possible group identifier(s) may include identifier(s) of one or more group(s) to which the server belongs (e.g. role(s) in overlay network, group of overlay IP addresses including the overlay IP address of the server, all overlay IP addresses, all servers in the overlay network, etc). Additionally or alternatively, a policy may be associated with user(s) authorized for the overlay network through unique or group identifier(s) as will be described in more detail with reference to method 400. In other embodiments, there may not necessarily be an association through unique or group identifier(s).

In embodiments where policy/ies may be translated into rule(s) to implement policy/ies, translation may include comparing each possible rule to policy, retaining if conforming to policy, and discarding if not conforming to policy. Alternatively, optimization of translation into rules may be performed.

Embodiments of configuration of an overlay network such as overlay network 100 will now be described with additional reference to machine authentication token(s).

In embodiments where a machine authentication token may be used to authenticate a gateway or server in an overlay network such as overlay network 100 vis-à-vis management machine 280, if for any reason a new machine authentication token is needed, then management machine 280 may allocate a new token.

Allocation of a new token may occur, for example if a previous machine authentication token is about to expire or, for example if there is a problematic token. A token may be problematic, for instance because of duplication of a server. Assume, for instance that a machine authentication token may be associated with a machine by way of several parameters such as IP address, Media Access Control (MAC) address, host identifier (hostID) which are included in the token information. During interaction of a machine (e.g. gateway, server) with management machine 280, management machine 280 may receive a machine authentication token from the machine and may compare the parameters of the machine to the parameters included in the token information. If during an interaction the parameters do not match (meaning that the interacting machine is a different machine than the machine for which the token was generated), management machine 280 may act in accordance with a procedure regarding a non-matching token. Such a procedure may include providing a different machine authentication token (e.g. since it is assumed that the interacting server is a duplicate of another server which was allowed to be duplicated and therefore the duplicate server has the same authentication token as the other server but different parameters), or marking the interacting server for manual enrollment (e.g. in order to check that the interacting server is a legitimate duplicate), etc.

Alternatively to the embodiments illustrated and described with respect to method 300, stages which are illustrated or described as being executed sequentially may in some other embodiments be executed in parallel or stages illustrated or described as being executed in parallel may in some other embodiments be executed sequentially. Alternatively to the embodiments illustrated and described with reference to method in 300, method 300 may in some other embodiments include more, fewer or different stages than illustrated or described. Alternatively to the embodiments illustrated and described with respect to method 300, stages may in some other embodiments be executed in a different order than illustrated or described.

Figure 4:
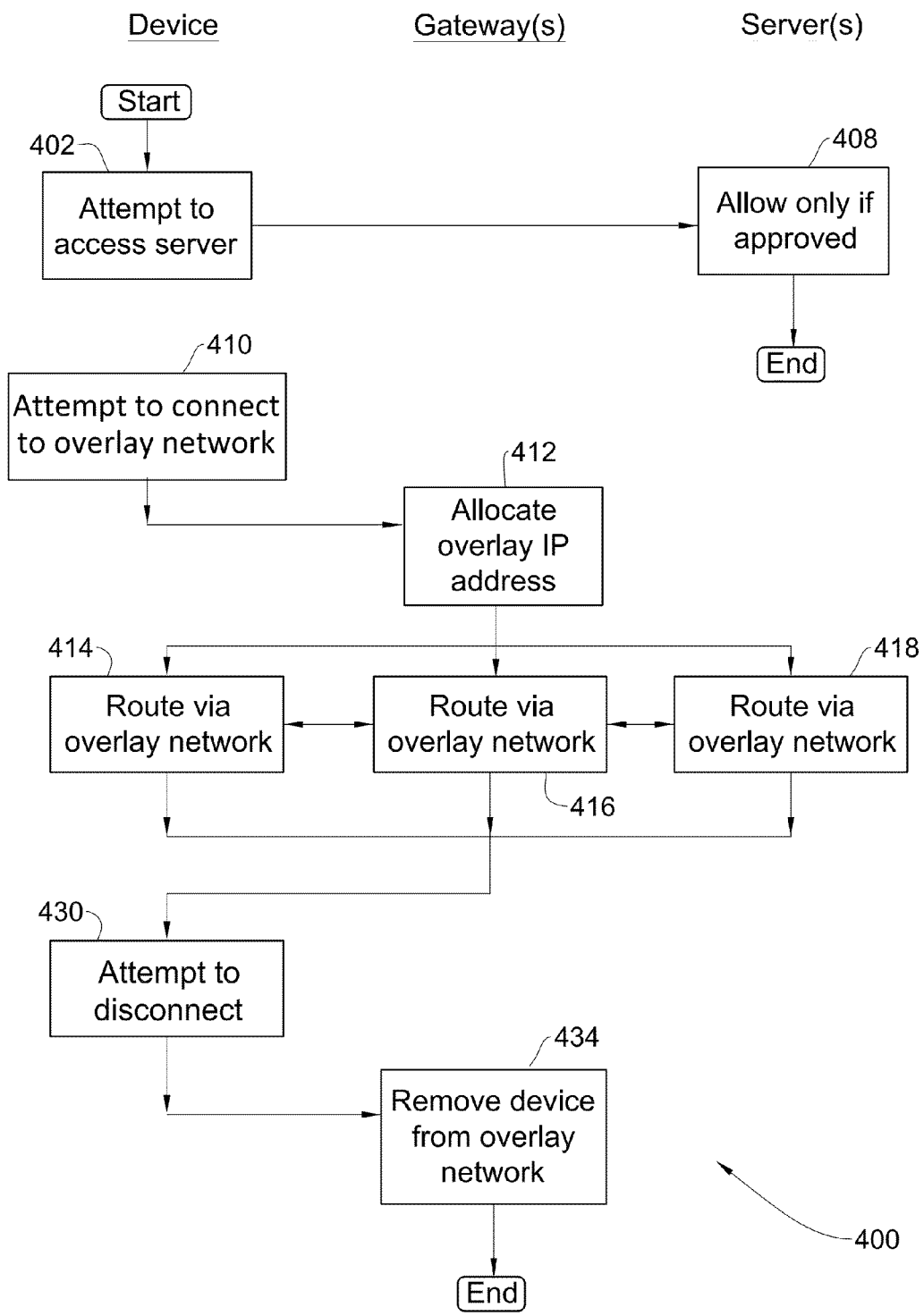
FIG. 4 illustrates a method of accessing a server included in an overlay network, in accordance with some embodiments of the presently disclosed subject matter.

Refer to FIG. 4 which illustrates a method 400 of accessing a server included in an overlay network, in accordance with some embodiments of the presently disclosed subject matter. For the purpose of illustration only, it is assumed that the overlay network is overlay network 100.

Although it is possible that there may be one or more device(s) 175 which may be attempting to access one or more server(s) in the overlay network, for the purpose of illustration only, embodiments of method 400 will describe an attempt by a single device to access server(s) from outside the overlay network and an attempt by a single device to access server(s) via a gateway.

In the illustrated embodiments, in stage 402, a machine such as device 175 may attempt to access a server (e.g. provided by a cloud provider) in the overlay network, from outside the overlay network. In the illustrated embodiments, in stage 408, the server may or may not allow access by device 175. For instance, only approved traffic from outside the overlay network may be allowed. For the purpose of illustration only, referring to FIG. 1, device 180 or its associated user may be approved for accessing server(s) such as web-server 140 via HTTP. Server(s) (e.g. web-server 140) may therefore allow access by device 180 in stage 408 of the illustrated embodiments. Unapproved traffic (e.g. device 190 in FIG. 1) may not be able to access the server(s). For instance, an internal or external firewall (e.g. based on IPtables or any other internal or external firewall technology) associated with any server may allow only approved traffic from the underlying network. (As noted above in some embodiments an external firewall may not be relevant, for instance if data is encrypted). In the illustrated embodiments, method 400 may then end for this device.

Additionally or alternatively, in the illustrated embodiments, in stage 410 a device 175 (e.g. as a VPN client) may attempt to connect to the overlay network via a gateway such as gateway 160. This attempt may occur at any time, for example unrelated to the stages of method 400 previously discussed, and therefore there is no arrow in FIG. 4 between the previous stages and stage 410. For instance the device may attempt to connect to the overlay network by providing an identifier of the associated user (e.g. username and password) to the gateway. The device may have been provided with the external DNS name (e.g. relating to the underlying network) of gateway 160 which may be used in the connection attempt.

In the illustrated embodiments in stage 412, gateway 160 may verify that the identifier (e.g. username and password) belongs to a user authorized for the overlay network. It is assumed in the illustrated embodiments that the user is authorized. For instance, in FIG. 1 an authorized user may be associated with device 170, and therefore the device will be referred to for the remainder of method 400 as device 170. Gateway 160 may therefore assign an overlay IP address to device 170, for instance from the pool of overlay IP addresses (e.g. which was previously provided by management machine 280 or previously allocated by the gateway). Device 170 may then be connected to the overlay network (until disconnected). Depending on the embodiment device 170 or gateway 160 may act to connect device 170 to the overlay network. For instance, the connecting of device 170 to the overlay network may include establishing between device 170 and gateway 160 at least one secure tunnel such as Internet Protocol Security (IPsec) layer 2 tunneling protocol (L2TP) or any other layer 2 or 3 solution (proprietary or non-proprietary) which may provide secure connectivity. For instance, the establishment of a secure tunnel may mean that packets may be encrypted, may mean that packets may be authenticated, or may mean that it may be less likely for packets to be intercepted or forged.

Gateway 160 may route traffic on the overlay network for currently logged on user(s) (associated with connected device(s)). Depending on the embodiment when routing traffic, gateway 160 may or may not implement an access control policy relating to authorized user(s). In embodiments with an access control policy relating to authorized user(s), any connected device associated with an authorized user may be allowed to access one or more server(s) in the overlay network or may not be allowed to access one or more server(s) in the overlay network, depending on the policy. In some embodiments with an access control policy relating to authorized user(s), a user may be identified by unique identifier(s) (e.g. username or overlay IP address of associated device assigned by gateway 160) or by identifier(s) of one or more group(s) to which the user or associated device belongs (e.g. user role(s), group of overlay IP addresses including the overlay IP address assigned to associated device, all overlay IP addresses, all users, etc). For instance any user which is authorized for an overlay network may be a party associated with the overlay network and may have role(s) (e.g. within a party such as a company or organization associated with the overlay network). In some embodiments, an access control policy may be associated with user(s) for instance through unique or group identifier(s), whereas in other embodiments, there may not necessarily be an association through unique or group identifier(s).

In embodiments with an access control policy relating to authorized user(s), in order to implement the policy for user(s) which are currently logged on to the overlay network (or attempting to log on), gateway 160 may or may not translate the policy into firewall rule(s). Although not necessarily so, in some embodiments translation may be triggered upon a user logging on to (or attempting to log onto) the overlay network. Therefore in method 400 translation may be triggered, for instance when device 170 connects or is in the process of getting connected to the overlay network (e.g. stage 410 or after). In some embodiments, when translating a policy into rule(s), each possible rule may be compared to policy, retained if conforming to policy, and discarded if not conforming to policy. Alternatively, optimization of rule translation may be performed. The firewall rules for instance may be for an internal firewall or for an external firewall (e.g. based on IPtables or any other internal or external firewall technology). (As noted above in some embodiments an external firewall may not be relevant, for instance if data is encrypted). The rules may for instance refer to assigned device overlay IP address(es), and therefore may change as device(s) connect or disconnect from the overlay network.

In embodiments where gateway 160 may not implement an access control policy relating to user(s) authorized for the overlay network, the access allowed by any device (associated with an authorized user) may not be dependent on the user. In these embodiments, any device which may be associated with an authorized user and which may be part of the overlay network may be able to access at least one fixed basis machine(s) in the overlay network. For instance, device 170 may be able to access all machines that may be in overlay network on a fixed basis (e.g. server(s), gateway(s)), or less than all machine(s) that may be in overlay network on a fixed basis but where differentiation is not due to the associated user.

In the illustrated embodiments, in stages 414, 416 and 418, it is assumed that the device may want to access one or more server(s) via the gateway(s), and therefore data packets between server(s) and device 170 via one or more gateway(s) may be routed over the overlay network. In some embodiments with an access control policy relating to authorized user(s), the access to server(s) by device 170 may be controlled by the gateway(s) in accordance with the policy, whereas the server(s) may allow all traffic routed via the gateway(s).

As noted above the overlay network is on an underlying network and therefore to enable delivery of a packet either a public or private IP address may be used to encapsulate the overlay IP address. In some embodiments tunnels (e.g. IPsec) may be opened on both public and private IP addresses, if available, and the most appropriate tunnel in accordance with the policy may be used for the routing (e.g. using IP in IP or GRE). Depending on the embodiment, the policy/ies of whether to use a public or private IP address to encapsulate the overlay IP address may vary and therefore the rule(s) implemented regarding delivery may vary. Although not necessarily so, private IP addresses may be preferred when either public or private may be used. For instance, within a cloud private tunnels may be used, and between clouds or between a cloud and outside a cloud public tunnels may be used. Continuing with this instance, in some cases if either a public or private IP address may be used, a network layer may attempt to use the private IP address whenever possible and only if using the private IP address is unsuccessful, may use the public IP address. Continuing with this instance, when routing from gateway 160 to device 170, the overlay IP address which was assigned to device 170 may be encapsulated by the public IP address associated with device 170. In some embodiments, the ability to use private or public IP addresses for delivery may enhance the overlay network stability because the overlay network may not necessarily rely on one type of tunnel or another. For instance, in some cases the network provided by the cloud provider may fail and the public tunnel may necessarily be used.

In embodiments with encryption keys or other cryptographic data, the keys or other cryptographic data may or may not be used to encrypt communication (e.g. IPSec communication) in the overlay network.

Depending on the embodiment, gateway 160 may or may not function as a DNS server for the overlay network, translating internal DNS name(s) of server(s) (e.g. provided to gateway 160 by device 170) to overlay IP addresses of server(s). If the gateway functions as a DNS server, device 170 may have received prior to stage 402 a Point to Point Protocol (PPP) configuration to be directed to the gateway as a DNS server.

Depending on the embodiment, gateway 160 may or may not translate the overlay IP address assigned to device 170 into the overlay IP address of gateway 160 when routing packets to server(s), as per network address translation (NAT).

In the illustrated embodiments in stage 430, the associated user may desire to log off and therefore device 170 may attempt to disconnect from the overlay network. In the illustrated embodiments in stage 434, gateway 160 to which device 170 was connected, may remove device 170 from the overlay network so that data packet(s) are no longer routed over the overlay network to or from device 170. Depending on the embodiment, after stage 434 the overlay IP address associated with device 170 may or may not be assigned (e.g. by gateway 160) to a machine (e.g. to device 170 or to another device which later attempts to connect to the overlay network). In embodiments where gateway 160 implements an access control policy relating to authorized user(s), when device 170 attempts to disconnect from the overlay network or is removed from the overlay network, then depending on the embodiment, gateway 160 may or may not remove firewall rules(s) relating to the associated user (e.g. and not relating to any other user currently logged on). In the illustrated embodiments, method 400 may then end.

Alternatively to the embodiments illustrated and described with respect to method 400, stages which are illustrated or described as being executed sequentially may in some other embodiments be executed in parallel or stages illustrated or described as being executed in parallel may in some other embodiments be executed sequentially. Alternatively to the embodiments illustrated and described with reference to method in 400, method 400 may in some other embodiments include more, fewer or different stages than illustrated or described. Alternatively to the embodiments illustrated and described with respect to method 400, stages may in some other embodiments be executed in a different order than illustrated or described.

The described subject matter may in some embodiments provide an overlay network which is dynamic where machine(s) (e.g. machine(s) provided by cloud provider(s)) may be added or removed from the overlay network. Therefore in some cases of these embodiments, the described subject matter may enable taking advantage of the rapid elasticity characteristic of cloud computing. The described subject matter may in some embodiments enable access of machine(s) (e.g. machine(s) provided by cloud provider(s)) via a (machine) device (e.g. device 175 or 270) which may be a standard device, as needed and automatically. Therefore in some cases of these embodiments the described subject matter may enable taking advantage of the broad network access or on-demand self service characteristics of cloud computing. The described subject matter may in some embodiments allow for one or more features such as secured computing or stable computing as described herein which are not promised characteristics of cloud computing, but which may be desirable for an overlay network. Therefore in some cases of these embodiments the described subject matter may provide one or more desirable features which are not characteristics promised by cloud computing.

It will also be understood that the subject matter contemplates that a system or part of a system disclosed herein may be, at least partly for example, a suitably programmed machine. Likewise, the subject matter contemplates, for example, a computer program being readable by a machine for executing a method or part of a method disclosed herein. Further contemplated by the subject matter, for example, is a machine-readable medium tangibly embodying program code readable by a machine for executing a method or part of a method disclosed herein.

While embodiments of the presently disclosed subject matter have been shown and described, the subject matter is not thus limited. Numerous modifications, changes and improvements within the scope of the subject matter will now occur to the reader.

The invention claimed is:

1. A method of managing an overlay network, performed by a management machine, comprising:
   determining that a server or gateway provided by a cloud provider is to be added to said overlay network;
   generating a temporary machine authentication token for said server or gateway;
   receiving said temporary machine authentication token from said server or gateway and authenticating said server or gateway;
   receiving at least one parameter associated with said server or gateway from said server or gateway, each of said at least one parameter being received when receiving said temporary token or after receiving said temporary token; and
   providing a replacement longer expiration machine authentication token that includes at least one received parameter associated with said server or gateway to said server or gateway,
   wherein after said replacement token has been provided, said server or gateway connects to the overlay network, including establishing at least one secure tunnel, and wherein for any secure tunnel a private Internet Protocol (IP) address or a public IP address of said server or gateway is used to encapsulate an overlay IP address that was allocated to said server or gateway.

2. The method of claim 1, further comprising:
receiving said longer expiration machine authentication token from a different machine;
determining that said longer expiration machine authentication token does not match said different machine; and
acting in accordance with a procedure regarding a non-matching token.

3. The method of claim 1, further comprising:
generating program code for requesting software for said server or gateway.

4. The method of claim 1, wherein said at least one parameter associated with said server or gateway was gathered by said server or gateway and includes at least one of said private IP Address or said public IP address.

5. The method of claim 1, further comprising:
receiving said replacement token during interaction with the server or gateway;
comparing the at least one parameter included in said replacement token with at least one parameter of said server or gateway; and
authenticating said server or gateway.

6. A management machine for managing an overlay network, said management machine comprising a processor and a non-transitory memory, the processor configured to execute instructions stored in the memory to:
determine that a server or gateway provided by a cloud provider is to be added to said overlay network;
generate a temporary machine authentication token for said server or gateway;
receive said temporary machine authentication token from said server or gateway and authenticating said server or gateway;
receive at least one parameter associated with said server or gateway from said server or gateway, each of said at least one parameter being received when receiving said temporary token or after receiving said temporary token; and
provide a replacement longer expiration machine authentication token that includes at least one received parameter associated with said server or gateway to said server or gateway,
wherein after said replacement token has been provided, said server or gateway connects to the overlay network, including establishing at least one secure tunnel, and
wherein for any secure tunnel a private Internet Protocol (IP) address or a public IP address of said server or gateway is used to encapsulate an overlay IP address that was allocated to said server or gateway.

7. The management machine of claim 6, wherein said processor is further configured to execute instructions stored in the memory to:
receive said longer expiration machine authentication token from a different machine;
determine that said longer expiration machine authentication token does not match said different machine; and
act in accordance with a procedure regarding a non-matching token.

8. The management machine of claim 6, wherein said processor is further configured to generate program code for requesting software for said server or gateway.

9. The management machine of claim 6, wherein said at least one parameter associated with said server or gateway was gathered by said server or gateway and includes at least one of said private IP Address or said public IP address.

10. The management machine of claim 6, wherein the processor is further configured to execute instructions to:
receive said replacement token during interaction with the server or gateway;
compare the at least one parameter included in said replacement token with at least one parameter of said server or gateway; and
authenticate said server or gateway.

11. A computer program product comprising a non-transitory machine useable medium having machine readable program code embodied therein for managing an overlay network, the computer program product comprising:
machine readable program code for causing a machine to determine that a server or gateway provided by a cloud provider is to be added to said overlay network;
machine readable program code for causing the machine to generate a temporary machine authentication token for said server or gateway;
machine readable program code for causing the machine to receive said temporary machine authentication token from said server or gateway and to authenticate said server or gateway;
machine readable program code for causing the machine to receive at least one parameter associated with said server or gateway from said server or gateway, each of said at least one parameter being received when receiving said temporary token or after receiving said temporary token; and
machine readable program code for causing the machine to provide a replacement longer expiration machine authentication token that includes at least one received parameter associated with said server or gateway to said server or gateway,
wherein after said replacement token has been provided, said server or gateway connects to the overlay network, including establishing at least one secure tunnel, and
wherein for any secure tunnel a private Internet Protocol (IP) address or a public IP address of said server or gateway is used to encapsulate an overlay IP address that was allocated to said server or gateway.

12. The computer program product of claim 11, further comprising:
machine readable program code for causing the machine to receive said longer expiration machine authentication token from a different server or gateway;
machine readable program code for causing the machine to determine that said longer expiration machine authentication token does not match said different server or gateway; and
machine readable program code for causing the machine to act in accordance with a procedure regarding a non-matching token.

13. The computer program product of claim 11, further comprising: machine readable program code for causing the machine to generate program code for requesting software for said server or gateway.

14. The computer program product of claim 11, wherein said at least one parameter associated with said server or gateway was gathered by said server or gateway and includes at least one of said private IP Address or said public IP address.

15. The computer program product of claim 11, further comprising:
  machine readable program code for causing the machine to receive said replacement token during interaction with the server or gateway;
  machine readable program code for causing the machine to compare the at least one parameter included in said replacement token with at least one parameter of said server or gateway; and
  machine readable program code for causing the machine to authenticate said server or gateway.

16. A method of adding a server provided by a cloud provider to an overlay network, comprising:
  a device accessing management software in a management machine and indicating that a server provided by a cloud provider is to be added to an overlay network, thereby enabling the management machine to generate a temporary machine authentication token for said server, and the management machine to provide a replacement longer expiration machine authentication token that includes at least one received parameter associated with said server to said server after receiving the temporary token from said server, after receiving at least one parameter associated with said server from said server, and after authenticating said server, wherein after said replacement token has been provided, said server connects to the overlay network, including establishing at least one secure tunnel, and wherein for any secure tunnel a private Internet Protocol (IP) address or a public IP address of said server is used to encapsulate an overlay IP address that was allocated to said server.

17. The method of claim 16, further comprising:
  the device providing the temporary token generated by the management machine to the server.

18. A device comprising a processor and a non-transitory memory, the processor configured to execute instructions stored in the memory to:
  access management software in a management machine and
  indicate that a server provided by a cloud provider is to be added to an overlay network, thereby causing the management machine, responsive to receipt of the indication from the device that the server is to be added,
    to generate a temporary machine authentication token for said server, and
    to provide a replacement longer expiration machine authentication token to said server that includes at least one received parameter associated with said server after receiving the temporary token from said server, after receiving at least one parameter associated with said server from said server, and after authenticating said server,
  wherein after said replacement token has been provided to said server, said server connects to the overlay network, including establishing at least one secure tunnel, and wherein for any secure tunnel a private Internet Protocol (IP) address or a public IP address of said server is used to encapsulate an overlay IP address that was allocated to said server.

19. The device of claim 18, wherein said processor is further configured to execute instructions to provide the temporary token generated by the management machine to the server.

20. A computer program product comprising a non-transitory machine useable medium having machine readable program code embodied therein for adding a server provided by a cloud provider to an overlay network, the computer program product comprising: machine readable program code for causing a machine to access management software in a management machine and indicate that a server provided by a cloud provider is to be added to an overlay network, thereby enabling the management machine to generate a temporary machine authentication token for said server, and the management machine to provide a replacement longer expiration machine authentication token that includes at least one received parameter associated with said server to said server after receiving the temporary token from said server, after receiving at least one parameter associated with said server from said server, and after authenticating said server, wherein after said replacement token has been provided, said server connects to the overlay network, including establishing at least one secure tunnel, and wherein for any secure tunnel a private Internet Protocol (IP) address or a public IP address of said server is used to encapsulate an overlay IP address that was allocated to said server.

21. The computer program product of claim 20, further comprising:
  machine readable program code for causing the machine to provide the temporary token generated by the management machine to the server.

22. A method of adding a server or gateway provided by a cloud provider to an overlay network, performed by said server or gateway, comprising:
  receiving a temporary machine authentication token generated by a management machine for said server or gateway, after said management machine has determined that said server or gateway is to be added to said overlay network;
  providing the temporary machine authentication token to the management machine;
  providing at least one parameter associated with said server or gateway to the management machine, each of said at least one parameter associated with said server or gateway being provided when providing said temporary token or after providing said temporary token;
  receiving a replacement longer expiration machine authentication token that includes at least one provided parameter associated with said server or gateway from said management machine; and
  connecting to the overlay network, including establishing at least one secure tunnel,
  herein for any secure tunnel a private Internet Protocol (IP) address or a public IP address of said server or gateway is used to encapsulate an overlay IP address that was allocated to said server or gateway.

23. The method of claim 22, further comprising:
  providing said replacement token to the management machine during interaction with the management machine, thereby enabling the management machine to compare the at least one parameter included in said replacement token with at least one parameter of the server or gateway and authenticate the server or gateway.

24. The method of claim 22, wherein said at least one parameter associated with said server or gateway was gathered by said server or gateway and includes at least one of said private IP Address or said public IP address.

25. A server or gateway comprising a processor and a non-transitory memory, provided by a cloud provider, the processor configured to execute instructions stored in the memory to:
  receive a temporary machine authentication token generated by a management machine for said server or gateway after said management machine has determined that said server or gateway is to be added to an overlay network;
provide the temporary machine authentication token to the management machine;
provide at least one parameter associated with said server or gateway to the management machine, each of said at least one parameter being provided when providing said temporary token or after providing said temporary token;
provide a replacement longer expiration machine authentication token that includes at least one provided parameter associated with said server or gateway from said management machine; and
connect to the overlay network, including establishing at least one secure tunnel, wherein for any secure tunnel a private Internet Protocol (IP) address or a public IP address of said server or gateway is used to encapsulate an overlay IP address that was allocated to said server or gateway.

26. The server or gateway of claim 25, wherein said server or gateway is further configured to:
provide said replacement token to the management machine during interaction with the management machine, thereby causing the management machine to compare the at least one parameter included in said replacement token with at least one parameter of said server or gateway and authenticate said server or gateway.

27. The server or gateway of claim 25, wherein said at least one parameter associated with said server or gateway was gathered by said server or gateway and includes at least one of said private IP Address or said public IP address.

28. A computer program product comprising a non-transitory machine useable medium having machine readable program code embodied therein for adding a machine provided by a cloud provider to an overlay network, the computer program product comprising:

machine readable program code for causing a machine to receive a temporary machine authentication token generated by a management machine for said machine after said management machine has determined that said machine is to be added to an overlay network;
machine readable program code for causing the machine to provide the temporary machine authentication token to said management machine for authentication;
machine readable program code for causing the machine to provide at least one parameter associated with said machine to said management machine, each of said at least one parameter being provided when providing said temporary token or after providing said temporary token;
machine readable program code for causing the machine to receive a replacement longer expiration machine authentication token that includes at least one provided parameter associated with said machine from said management machine; and
machine readable program code for causing the machine to connect to the overlay network, including establishing at least one secure tunnel, wherein for any secure tunnel a private Internet Protocol (IP) address or a public IP address of said machine is used to encapsulate an overlay IP address that was allocated to said machine.

29. The computer program product of claim 28, further comprising:
machine readable program code for causing the machine to provide said replacement token to the management machine during interaction with the management machine, thereby enabling the management machine to compare the at least one parameter included in said replacement token with at least one parameter of said machine and authenticate said machine.

30. The computer program product of claim 28, wherein said at least one parameter associated with said machine was gathered by said machine and includes at least one of said private IP Address or said public IP address.

* * * * *